US007085772B1

(12) United States Patent
Sternemann

(10) Patent No.: US 7,085,772 B1
(45) Date of Patent: Aug. 1, 2006

(54) METHOD FOR PROCESSING DATA OBJECTS

(76) Inventor: Karl-Heinz Sternemann, Sessgasse 13a, 77830 Bühlertal (DE)

( * ) Notice: Subject to any disclaimer, the term of this patent is extended or adjusted under 35 U.S.C. 154(b) by 0 days.

(21) Appl. No.: 09/869,182

(22) PCT Filed: Dec. 23, 1999

(86) PCT No.: PCT/EP99/10377

§ 371 (c)(1),
(2), (4) Date: May 21, 2002

(87) PCT Pub. No.: WO00/38084

PCT Pub. Date: Jun. 29, 2000

(30) Foreign Application Priority Data

Dec. 23, 1998 (DE) .............................. 198 60 008

(51) Int. Cl.
*G06F 17/30* (2006.01)
(52) U.S. Cl. ...................................... 707/103; 707/100
(58) Field of Classification Search ............ 707/103 R, 707/103, 100
See application file for complete search history.

(56) References Cited

U.S. PATENT DOCUMENTS 5,842,218 A 11/1998 Robinson
5,918,232 A * 6/1999 Pouschine et al. ...... 707/103 R

FOREIGN PATENT DOCUMENTS

EP 0572749 A1 12/1993

OTHER PUBLICATIONS

Jim Gary et al, Data mining and knowledge discovery, 1997, kluwer Academic Publishers, pp. 29-53.*
Pollitt, et al., HIBROWSE: adding the power of relational datsbases to the traditional IR architecture- the future for Graphic User Interfaces, Information Retrieval, Mar. 29, 1993, pp. 108-118.
Pollitt, et al., HIBROWSE for bibliographic databases, Journal of Information Science, 20 (6) 1994, pp. 413-426.
Hearst, et al., Cat-a-Cone: An Interactivee for Specifying Searches and Viewing Retrieval Results using a Large Category Hierarchy, Sigir Proceedings, Jul. 27, 1997, pp. 246-254.
Spiegler, et al., Storage and Retrieval Considerations of Binary Data Bases, Information Processing & Management, 21 (3), 1985, pp. 233-253.

(Continued)

*Primary Examiner*—Leslie Wong
*Assistant Examiner*—CamLinh Nguyen
(74) *Attorney, Agent, or Firm*—Knobbe Martens Olson & Bear LLP

(57) ABSTRACT

A method for processing data objects, which are arranged in a data space, provides a multidimensional information space with discrete storage locations that represent information objects. Each information object is derived from an information basic object and contains at least one index specification which is characteristic for the position of the data object in the data space. In addition, each information object has at least one attribute specification for at least one virtual dimension of the information space. The information object can be identified in the information space using a processor of a computing device. Processing of the data object can be prompted by at least one instruction record.

106 Claims, 14 Drawing Sheets

OTHER PUBLICATIONS

European Patent Office Action dated Feb. 16, 2005 for application No. 99967981.

Chaudhuri, et al., An Overview of Data Warehousing and OLAP Technology, Sigmod record, Sigmod, New York, NY, US, Mar. 1997, ISSN 0163-5808, pp. 65-74.

Schmidt, et al., Interaktiv in Web, CGI-Progammierung fur den Hausgebrauch, Teil 1, 1998, vol. 24, pp. 226-235.

Schmidt, et al., Web-aktiv, CGI-Progammierung fur den Hausgebrauch, Teil II, 1998, vol. 25, pp. 256-258 and 260-263.

European Patent Office Action dated Jun. 28, 2004 for application No. 99967981.

* cited by examiner

Ergebnis der Datenbanksuche: Seite [1] von 6

[Seite zurück] [Seite vor] [Hitliste] ~85
   83        84

| Dokument Typ | Informationsobjekt |
|---|---|
| 86 ~ Aktionsprogramm : | Lagerinformationssystem ▶ ~87 |
| Aktionsprogramm : | Schallmessung ▶ |
| Aktionsprogramm : | wassergef. Stoffe ▶ |
| Aktionsprogramm : | Wasser/Abwasser ▶ |
| Aktionsprogramm : | Anlagensicherheit/Vorbeugender Brandschutz ▶ |
| Aktionsprogramm : | Nutzwertanalyse ▶ |
| BlockSchaltBild : ⊣C | Koehler_Gruppe ▶ |
| BlockSchaltBild : ⊣C | .Werk_Oberkirch ▶ |
| BlockSchaltBild : ⊣C | ..Roh-u.Hilfsstoff_Auflösung ▶ |
| BlockSchaltBild : ⊣C | ..Energieversorgung_(intern) ▶ |
| BlockSchaltBild : ⊣C | ...Wasserkraft ▶ |
| BlockSchaltBild : ⊣C | ...Brunnenwasserversorgung ▶ |
| BlockSchaltBild : ⊣C | ..Naturpapier ▶ |
| BlockSchaltBild : ⊣C | ...PM III ▶ |
| BlockSchaltBild : ⊣C | ...PM IV ▶ |
| BlockSchaltBild : ⊣C | ..SD-Papier ▶ |
| BlockSchaltBild : ⊣C | ...PM V ▶ |
| BlockSchaltBild : ⊣C | ...Streichmassenaufbereitung ▶ |
| BlockSchaltBild : ⊣C | ...Kapselherstellung ▶ |
| BlockSchaltBild : ⊣C | ..Wasserversorgung ▶ |

METHOD FOR PROCESSING DATA OBJECTS

FIELD OF THE INVENTION

The present invention deals with a procedure for the processing of data objects.

DESCRIPTION OF THE RELATED TECHNOLOGY

Procedures for data processing are known in prior art, for example, procedures enabling the saving or the recovery of data or documents in or accordingly from a large data resource. The electronic media, e.g. the Internet, in particular provides the user today with a large amount of information; nevertheless, to search for information in the Internet or in the information inventory of one's own company can perhaps be very time consuming. While on the one hand, the number of the available data is continuously increasing, on the other hand, a lack of information is emerging.

SUMMARY OF CERTAIN INVENTIVE ASPECTS

The object of the present invention is to provide a procedure for the processing of data objects.

A method for processing data objects, which are arranged in a data space, provides a multidimensional information space with discrete storage locations that represent information objects. Each information object is derived from an information basic object and contains at least one index specification which is characteristic for the position of the data object in the data space. In addition, each information object has at least one attribute specification for at least one virtual dimension of the information space. The information object can be identified in the information space using a processor of a computing device. Processing of the data object can be prompted by at least one instruction record.

The procedure in accordance with the invention for the processing of data objects has a data pace, in which the data objects are arranged. A multi-dimensional information space, with at least two virtual dimensions and preferably also at least a third virtual dimension, has in at least one dimension a large amount of discrete memory locations or memory units, or rather memory areas that are suitable to represent information objects. Each of the information objects represent at least one information base-object, or preferably derives from it through inheritance. An information base-object comprises of at least one pointer, which is characteristic for the position of at least one data object in the data space, and at least one property data for at least one virtual dimension of the information space, and preferably, for each virtual dimension of the dimension space. Furthermore, a set of instructions is provided with at least one instruction concerning the processing of the data object.

The information object can be identified (preferably clearly) in the information space with at least one computer device that has at least one processor. Furthermore, the information object and/or the data object can be processed according to at least one instruction, from this set of instructions, with at least one computer device.

The procedure in accordance with the invention has many advantages.

With the procedure in accordance with the invention the data objects are arranged in the data space, thus e.g. saved, which could also be realized with conventional, prior art methods. Additionally, a multi-dimensional information space is provided that contains information objects, with each information object being characteristic for at least one data object in the data space. Through this separation of the data space and the information space a flexible information representation is permitted.

In particular, the multi-dimensionality of the information space is advantageous, since attributes for the data object can be defined for two or more virtual dimensions of the information space, moreover, a specific view to the data objects in the data space is enabled. For example, process information aspects can be assigned in one virtual dimension in the information space while another virtual dimension contains information aspects concerning the sphere of action or the organization. Consequently, a user or application specific view of the information object and/or the data object can be created.

An information object contains, in addition to at least one property data concerning at least one virtual dimension of the information space, one pointer, which is characteristic for at least one data object. This means that in the information object at least one property data is provided for the position of one data object; however, is it also possible that the data object is integrated in the information object, so that the information space and the data space partially overlap one another.

Such an overlapping of the information space and the data space is also advantageous, since the setup of the procedure and the individual components are simpler to create. The separation of the data space and the information space is, however, preferred, since this enables a flexible structure that is more easily scalable.

In a preferred development of the procedure in accordance with the invention, at least one and preferably each virtual dimension of the information space is hierarchically arranged, whereby preferably the position of an information object within the hierarchy is determined through the characteristic data concerning this virtual dimension of the information object.

A hierarchical organization and/or arrangement of the information objects in the information space is particularly advantageous, since, for example, this enables an organization of the information objects concerning given or optional information aspects. If, for example, the information viewpoint "process" is assigned to a virtual dimension, then, for example, a hierarchical division or separation according to the viewpoints danger warning, disturbance repairing, maintenance, product improvement, licensing procedure, and product development takes place.

According to requirement it is possible to insert one, two or more subdivisions, in order to, for example, subdivide the information viewpoint "process" more precisely. Through the assignment of a property data in the form of a hierarchical data to a data object, a structured arrangement of data objects and/or information objects is attained in the information space, which enables the user to have a simpler filing, retrieval, execution or visualization, or the like of data objects.

The property data are preferably stored in the form of symbols in the information object, with these symbols preferably representing symbols such as letters and numbers, ASCII symbols or DBCS Symbols (Double Byte Character System).

Particularly preferred is that at least one hierarchical property data is specified as a set of two numbers, with separators such as colon, full-stop or the like being provided between the individual division levels. The first number describes, preferably, the highest and/or the first division level, while the second number characterizes the second division level.

It is preferred that the information base object, or rather the information object deriving from it, substantially and preferably has for each virtual dimension at least one property data. Furthermore, it is preferred that for several virtual dimensions the property data is represented as a property vector, whereby the individual property data in this vector or pointer can show a fixed and predetermined sequence. It is also possible for the sequence of the property data to be variable, whereby preferably for each property data a characteristic value is provided, which characterizes the corresponding virtual dimension. For example, it is possible that the property vector has the form "x:6, y:0, z:3.2". In this example "x" characterizes a first virtual dimension and the separation between the characterized value and property data can be enabled by means of a separator, which is represented here as ":".

However, it is also possible that no (due to defined location information) or any other separator symbols are provided, or that the value occurs after or according to the property data. Combining the property data in a property vector is extremely advantageous, since the property vector and/or the characteristic list, or the characteristic enumeration, or the like can be used separately.

If the characterized value, which characterizes the virtual dimension, is provided, it is also possible to use a smaller number of property data in the data vector than the number of virtual dimensions. If the characteristics concerning one or several virtual dimensions, or even all virtual dimensions are not required, a partially filled or even empty vector may be submitted. Consequently, achieving a larger flexibility of the procedure.

Preferably two, three or more virtual dimensions contain information objects, or rather pointer to information objects.

In a preferred development of the invention at least one instruction set is taken from a group of instruction sets, which comprise of instruction sets of organization or base, as well as request, creation, modification, searching, playback, representation, printing, generating, execution, control, calculation, evaluation, regulation, play, transformation and the like.

An organization set and/or base set of instructions can, for example, branch out to other named sets of instructions, so that the other named sets of instructions can be executed through using an organization instruction set.

The named sets of instructions enable the creation and/or generation or modification of information objects and data objects, as well as a request of data objects or a search for particular information objects.

Furthermore, a playback, presentation or representation as well as printing or playing graphic, acoustic or video data objects is possible. Control or regulation instruction sets, enabling a more precise control of, for example, production processes or business objects with corresponding transactions such as SAP (for example, R3), can be executed in the same way.

In a preferred development of the invention, the procedure can be controlled through transferring at least one control vector, whereby the control vector consists of at least one address vector that is characteristic for a position of a base or organization instruction set. When the procedure is started or controlled through transferring an address vector and/or an address data, then this form of the procedure requires no special set of instructions to be provided. The data of a base address and/or address vector is alone, preferably, sufficient enough to execute a base set of instructions.

In a preferred development of the procedure in accordance with the invention, the control vector comprises of, in addition to the address vector for example, but not only, in the form of a URN, URI or URL, as they are standardized by the W3C, e.g. "www.verfahren.steuerung", at least one instruction vector and/or one instruction pointer, for example, "data.asp", which is characteristic for a specific set of instructions.

If a control vector, which comprises of a non-empty instruction vector, is transferred to the procedure in accordance with the invention, then the corresponding characteristic set of instructions is executed. Conversely, if a control vector, which does not have an instruction vector or only an empty one, is transferred to the procedure in accordance with the invention, the base set of instructions and/or the organization set of instructions, for example "default.asp", is executed. Consequently, a flexible procedure control is achieved, since, for example, an inexperienced user only enters an address vector and the base set of instructions is executed, which allows the user, in a preferred development of the invention, to branch out to one of the above mentioned specific sets of instructions.

In a special development of the procedure in accordance with the invention, the procedure can be controlled via an Internet browser, whereby the address vector corresponds to the URL in the form "www.verfahren.steuerung".

In a further preferred development of the invention, the control vector comprises of at least one property vector (e.g. "Dimension1=0.2&Dimension2=0.2.3&Dimension3=0.4.6"), which characterizes an area of the information space. When the information space is hierarchically structured, a more precisely defined division or separation area can be defined in the multidimensional information space through the data of the property vectors, whereby this area can comprise of one or more information objects. Preferably, at the transfer of a control vector, which does not have a property vector or an empty property vector, a predetermined property vector is assumed that corresponds to the highest division level at the hierarchically divided information space (i.e. no division).

The additional possibility of transferring a property vector in the control vector in certainly advantageous, since a particularly flexible control of the procedure is enabled. Utilization of the instruction set can, thus, be specifically targeted at an information object or at an area, or the entire information space.

In a further preferred development of one or more of the previously described developments, the procedure is controlled in such a way through the transfer of a control vector and a pointer, so that at least one new information object with the transfer vectors and/or transfer parameters is created. In this case, the control vector contains at least one address vector and one instruction vector, whereby the control vector is divided, in a separating device, in at least these components. Following the separation, the set of instructions, characterized through the instruction vector, is called up and for the data object, defined through the pointer, a property vector with the processor device is generated. The processor device, of which there is at least one, generates from the pointer and the property vector at least one information object and saves this at least one information object, preferably, clearly in the information space.

Such a procedure for processing and/or creating an information object is very advantageous, since through transferring a pointer to the data object even already existing data objects can be integrated in the information space, thus data objects or data systems can be integrated in the information system and/or the information space via this set of instructions.

In a further preferred development of the procedure in accordance with the invention, the procedure is controlled in such a way through the transfer of a control vector and a data object, so that a set of instructions is executed that creates at least one new information object from the transfer list and/or from the parameters defined in the control vector.

For this purpose, the control vector is divided into at least one address vector and into one instruction vector in a separating device, and the set of instructions that are characterized through the instruction vector is called up.

The property vector derives from the control vector. This property vector can be either contained directly in the control vector, or generated in accordance with the previously described advantageous development, whereby the predetermined characteristics are assumed.

The data object is saved in the data space and a pointer, describing the position of the data object in the data space, is derived. Afterwards, at least one information object is created with this pointer and the property vector with one processor device.

This newly generated information object, of which there is at least one, is saved in the information space, whereby preferably one storage location and/or the hierarchy assignment of the information object, of which there is at least one and which is contained in the information space, is derived from the property vector.

This development is also very advantageous, since during the runtime of the procedure new data objects can be created, which can be immediately stored in the data space and in the information space at defined positions. In the same way, it is possible that a completed data object is transferred to the procedure and then one or more information objects can be generated.

In a preferred development of the procedure in accordance with the invention, the procedure is controlled in such a way through the transfer of a control vector, so that the discovering of an information object preferably through specific (especially preferred) selectable criteria is enabled.

For this purpose, in the procedure a control vector is transferred, which in a separating device is divided up into at least one address vector, one instruction vector and one property vector. If the control vector does not contain a property vector and/or only an empty one, then a predetermined property vector in accordance with a previously described development of the invention can be generated.

Firstly the set of instructions characterized though the instruction vector is called up. This instruction set (temporarily) generates a process vector with the computer device. The process vector contains predefined property data for substantially every virtual dimension of the dimension space. This process vector corresponds, in its formation, to the formation of the property vector and it derives from a predefined property vector through derivation.

The property vector deriving from the control vector is divided in a separating device into property data for the corresponding virtual dimensions. The property data for the incorporated virtual dimensions are assumed in the process vector, so that the process vector then contains the property data transferred in the procedure, in the corresponding virtual dimension. The process vector also contains predefined property data for the virtual dimensions, which were not contained in the transferred property vector.

Thereby enabling the transference of no property data or only property data for one or only a few virtual dimensions, to this preferred development of the procedure in accordance with the invention.

Furthermore, an empty result list is created, which is suitable to represent one or more information objects.

The procedure realizes a search for information objects in the information space, which has at least, substantially, corresponding property vectors. For this purpose a comparison is made for substantially every virtual dimension, in a comparison device, between the property data in the process vector and the property data in the information object of the information space. An information object or a reference to an information object in the information space is added to the result list, once substantially all the property data of the information object correspond with the property data in the process vector.

With reference to the wording "substantially . . . vector", it should be understood here that, for example, an exact correspondence exists; however, it is also possible that in the case of the hierarchical structuring of the property data in the information space, a correspondence can exist if the information object in the information space has a detailed property data, so that the property data in the processing vector is a general term of the property data in the information object.

If, for example, a property data referring to a "means of transport" were defined in an information dimension in a hierarchy, then there would be a logical derivation to a subordinate hierarchy level, for example the property data "car".

When, in accordance with a previously described development, the property data are defined in the form of numbers, whereby different division levels can be divided, for example, by points, then the division level "means of transport" could correspond to the number "2" and the division level deriving from it, "car", could, for example, have the division level "2.2". Now, if a search would be executed in the information space for information objects, which in relation to this virtual dimension have the property data "2", then, preferably, all the information objects would be added to the result list, which are structured on the division level "2" or below, for example, in "2.1", "2.2" etc.

When searching through substantially all the information objects located in the information space, a result file is preferably created, substantially comprising of all the elements of the result list. This result file is preferably distributed, whereby under "output" even a recording of the result list on a transient or intransient memory device is understood.

For example, the result filed can be created as a HTML file (hyper text markup language) or as a XML file (extensible markup language), which as references (Hyperlinks) contain the information objects or the data objects that are found during the search.

The preferred development is very advantageous, since under various information viewpoints searches can be targeted according to information and/or information objects or data objects.

In a further preferred development of the procedure in accordance with the invention, a navigation through the information space is enabled through the transfer of a control vector. For this purpose a control vector is transferred in the procedure. This control vector is divided, in a separating device, into at least one address vector and one instruction vector, as well as one property vector.

In a preferred development of the invention, the procedure and/or at least one set of instructions is executed on a first computer device, whereby the procedure is controllable from a second, even remote, computer device, whereby the first computer device is connected with the second computer device via at least one data connection.

Preferably, the procedure in accordance with the invention is preferably interactively, controllable by one user. The style of the data connection is thus basically as desired, the data connection can be taken from, for example, a group of data connections, which comprise of data connections via the telephone line, radio, network, internet, cable, as well as virtual data connections, serial data connections and the like.

A data connection via, for example, the Internet, Intranet or Extranet enables the user to control the procedure in accordance with the invention from almost any location.

In the same way, it is possible to execute the procedure in accordance with the invention on only one computer device via a virtual data connection, which communicates via a virtual interface in a computer device.

With reference to this, it should be pointed out that the term "computer device", used in this registration, should be understood as both a single computer device and a pool of spatially separated computer devices. Thus, the term "computer device" encompasses a single personal computer in the same way as it does a mainframe computer or a cluster from a large amount, also different or spatially separated computer devices.

Preferably, the communication between the individual computer devices, and/or the computer units contained in them, take place at least partially via a connection protocol and/or an interface protocol. To control the data connection and/or the procedure, standard protocols such as TCP/IP, UUCP, UDP, NETBIOS, NETBEUI or other known connection protocols are preferably used.

Furthermore, a well known protocol is used as service protocol or interface protocol, such as HTTP, FTP, NTP, SMTP, POP, IMAP, or the like, whereby HTTP or HTTPS via TCP/IP is used as an especially preferred base protocol. It is preferred that the procedure or at least one information object posses COM and/or DCOM functionalities (distributed component object model, or DOM characteristics (Document Object Model). It is also preferred that at least one part of the information objects possess OLE functionalities (object linking and embedding). Correspondingly, it is possible that at least one part of the objects is in accordance with the CORBA specification.

At least one part of the procedure and/or the object included in it preferably has an Active-X functionality, whereby it is equally possible that a single part runs via JAVA and/or RMI (remote method invocation) and/or in accordance with the JINI specification and/or have these characteristics.

With reference to database queries, it is preferred that standardized procedures such as SQL (structured query language), English Query, ODBC or ADO, or other state of the art query procedures are executed.

The utilization of known or standardized connection protocols, service protocols or interface protocols is very advantageous, since the functionalities of the procedure in accordance with the invention can be created more securely.

In a preferred development of one or all of the previously described developments of the procedure in accordance with the invention, at least one virtual type dimension is provided in the information space, whereby at least one type data about a type of corresponding data object is contained in this virtual type dimension for substantially every information object of the information space. Such a type dimension, for example, enables targeted searches for specific data objects or the use of a set of instructions to be limited to a predetermined or selectable data object type.

In a preferred development of the last described development, at least one type data is derived from the pointer or the name of the data object for at least one information object. For this purpose, at least one pointer of the information object, which represents a data object in the data space, is divided in the separating device into pointer parts. From these pointer parts, at least one type data derives from at least one characteristic pointer part (e.g. the file name and/or the file extension: *.txt, *.c etc.)

In a preferred development, the name of the data object or the name of the file is extracted from the pointer in the separating device. If the naming in the system is done in accordance with predetermined rules, it is possible to draw conclusions from the name of the data object about the type of the data object. In a known operating system, for example, the type of a data object is determined in a so-called file extension. With other operating systems the type of a data object can be requested from extended attributes, which are generated at the saving of a data object.

Such a development is certainly advantageous, since even an automated classification and/or type separation of data objects can be carried out.

In a further preferred development of the invention, at least one type data is derived from at least one part of the data object contents for at least one information object. For this purpose, in a separating device or an extraction device, at least on part of the data object contents is divided into content elements, which are then analyzed for characteristic attributes. With a comparison device, at least one content element can be defined with predefined, preferably changeable comparison content elements and when these correspond, at least one type data can be derived for the analyzed data object.

This development is very advantageous, since many file types have a characteristic byte sequence. Through comparing a characteristic byte sequence it is possible to determine, with a high reliability, the type of a data object (for example, Microsoft Word Document, Unix-Shell Program, HTML files, executable files and the like) or logical objects such as order confirmation, invoices, (company) suggestions for improvement and the like.

Different object types can also be defined for a file format, so that, for example, a text document has the object type "invoice", "order confirmation" or "company suggestions for improvement". The type can not only be determined according to the style of the document, but also according to the content of the document.

In a further preferred development of the invention, at least one information object and preferably all the information objects consist of at least one further object data, whereby at least one object data is taken from a group of object data, which comprise of at least one data of time, generation, time interval, validity, (access) frequency, owner, group (membership), access, read, write, modification, execution and the like.

Realizing one or more, or even all of the mentioned object data in an information object, enables a very precise control of the access rights and statistical evaluation, e.g. access frequency. For example, it would be possible to limit rights for displaying, the modification or creation of an information object to specific user recognition or group recognition, or the like. Users, who possess a corresponding authorization, for example, can only call up company critical data. In the same way, it is possible that information objects containing executable sets of instructions can only be called up and/or executed by authorized users.

In a preferred development of the invention, the type data of an information object and/or data object is taken from a group of object types and/or type data, which contain in various data formats the known types of text file, picture file, graphic file, spreadsheet file, source code file, XML file, CAD file (computer aided design), program file, audio file, video file and the like.

In a preferred development of the procedure in accordance with the invention, for at least one information object at least one description field and/or info field is provided, to which one has access via the information object. Preferably at least one characterizing data in the description field is taken from the information object or the data object. Furthermore, notes or post-it information, for example, can be integrated in the description field. The description field can be included in the information object, or it may be a pointer on a separate description list.

In a preferred development of one or more of the previously described developments, at least one information object can have at least one connection to at least one further information object, thus enabling a navigation from a first information object to a second information object, to which the first is connected.

Such connections between information objects are very advantageous, since this allows the user to have a quick and uncomplicated navigation between, for example, thematically related information objects.

In a preferred development of the invention, for at least one information object at least one part of the contents of at least one description field of the information object is divided, in a separating device, into at least one property data. Furthermore, at least one characteristic content data is determined for this information object, of which there is at least one. Consequently it is possible that the characteristic content data is stored in a memory area of the information object; however, it is also possible that the property data, through targeted requests of an instruction set, is newly generated with each access.

In a further preferred development of the invention, at least one characteristic content data of an information object is compared, in a comparison device, with at least one characteristic content data of at least one other information object. When the characteristic content data at least substantially correspond, then it is possible for one information object to be connected to the other information object, whereby this can also take place automatically.

Such a development is very advantageous, since, for example, an automatic connection of similar information objects can take place. The connection can also be done manually.

In a further preferred development of one or more of the previously described developments, at least one virtual connection space is provided, which has and/or have in each case at least two connection dimensions and contains discrete memory locations, whereby these memory locations are created in such a way that they contain at least one connection data for characterizing at least unidirectional relationships between at least two different information objects. The memory location can be composed in at least one connection space so that, for example, only a logical value such 1 or 0 is accepted. Thus, the logical 1 would represent one connection between two information objects, while a logical 0 could characterize no connection.

It is also possible for the memory location to be composed so that a large amount of different values can be assumed. A 0 could then define no connection between two information objects, while a 1 would describe a connection between the first and the second and a 2, a bi-directional connection between both of the information objects. Through continuous values (real numbers, integers, etc.) a connection intensity can be described, which can be taken into consideration.

Similarly, it is also possible that a sign or a value is defined in the connection data, for example, an information object directly connected with a type or a group of information objects. For example, the connection data could refer to an area in the information space, thus enabling a connection with a large amount of information objects through the data, for example, a property vector.

In a further preferred development of the invention, at least one virtual connection space is provided as at least a two-dimensional connection table, whereby preferably, within at least one part of the rows, every row preferably represents one different information object, and whereby, within at least one part of the columns, preferably every column preferably describes one different information object.

In a preferred development of the last described development, the connection table, of which there is at least one, is two-dimensional with a square size, so that the number of rows equals that to the number of columns, and preferably both equal the number of information objects in at least one virtual dimension. Thus every row represents a different information object and every information object is represented by exactly one column. If in this case a table element of the connection table can accept, for example, the logical value 0 to 1, this means, for example a logical 1 in the $3^{rd}$ row and $5^{th}$ column, that the $3^{rd}$ information object has a direct relationship to the $5^{th}$ information object.

Such a development is very advantageous, since a smaller memory capacity is required and a high functionality is achieved. Each object can be connected with each object so that the reference from the actual information object to another information object can be called through a query of the connection space. Thus, enabling the user to navigate through connected information objects and query all the relevant information of a domain or, for example, acquire adjoining information domains.

Preferably, the connection space comprises of the connection table or connection matrices for substantially every virtual dimension.

In a preferred development of the invention, at least one set of instructions is provided, which reorganizes the information space when deleting of removing information objects from the information space, whereby the released memory location for an information object can not only be full through a newly created and/or to be newly created information object, but also substantially the entire information space can be newly reorganized, so that substantially no empty memory locations remain for the information objects.

In a further preferred development of the invention, it is preferred that the connection space is actualized when deleting an information object from the information space, so that a reference for the deleted information object does not exist in the dimension of the connection space. It is preferred that when organizing the connection space in the form of at least one two-dimensional table, the rows and the columns representing the deleted information object are removed. Thus, when deleting information objects in the information space, substantially all connections and/or pointers are removed from the other information elements to the now deleted information object.

Such a development is very advantageous, since "dead" connections or links running into an empty space are extensively avoided.

In a further preferred development of the procedure in accordance with the invention, a navigation through the information objects of the information space and/or through the information system is enabled via the transfer of a control vector. For this purpose, the control vector is divided up, in a computer device, into at least one address vector, at least one instruction vector and at least one property vector.

Similarly to one of the previously described developments, a process vector is generated with predefined property data in a processor device. The property vector, transferred in the procedure, is divided into individual property data, as in the previously described development, and the property data in the process vector are overwritten with these.

Following the creation of an empty search list, serving to receive information objects, a search for information objects in the information space is executed that has property data and/or property vectors, which substantially correspond with the process vector. When an information object substantially fulfills the conditions in the information space, a reference or a copy of the information object, or the information object itself is added to this search list.

Following the creation of an empty result list, likewise, serving to receive references or information objects, a search for connections and/or links, or references to other information objects is made for every element or information object of the search list in the connection space. When an information object, connected at least in a unidirectional way with the actual element of the result list, is found in the connection space, a reference, a copy or the information object itself is added to this result list. Consequently, it is possible for the connections, starting from the element and/or referenced to the element, and possibly its intensity to be considered.

A result file, comprising substantially of all the elements of the result list, is created from the result list. Preferably, this file is created in a standard format, for example in the HTML format, and contains references to the information objects or data objects in the form of hyperlinks. It should, however, be pointed out that in this and the previously described developments using a result list or result file, that these must not physically exist on, for example, a hard disk. They can, however, also exist as a virtual list or virtual file in a transient memory, for example, in the RAM.

The navigation possibility to the connected information object is certainly advantageous, since, for example, it enables the connection relationship between individual information objects or data objects to be graphically represented. Thus, providing the user with a clear view of the connection and/or information relationships. Similarly, this enables the user to move, substantially, through all the information of an information area.

In a preferred development of the procedure, at least on part of the instruction set can be executed on a remote computer device, for example, on a computer operated by the user. For example, the separating of the control vector can at least partially occur remotely.

It is particularly preferred that each information object is clearly identifiable in the information vector, for example, through a clear number, a name, a label, or a vector.

In a preferred development of one or more of the previously described developments, an information object is structured in such a way, so that it can include at least one information element, whereby an information element can represent an information object. Such a structurization enables an information object to contain one or more information objects, thus making it possible for an aggregation, accumulation or structured organization of information objects to be achieved in an information object.

This development is very advantageous, since it enables an organization of information objects in information objects. Thus, for example with block diagrams or flowcharts, a flowchart can represent an information object, and every element contained in it can likewise be an information object. Consequently, when presenting a flowchart or a block diagram, a component or an element can be branched out to either of these through selection. This element can then be represented in a more detailed way as a flowchart and/or as a block diagram.

Moreover, a hierarchical representation of the information can be achieved through a structured organization of information elements and/or information objects, whereby in a first rough view only the essential components are included. Through the selection of a single component the corresponding details can be presented, which in turn can contain information objects.

Further advantages, attributes and possibilities of use of the present invention result from the following descriptions of execution examples with accompanying illustrations.

BRIEF DESCRIPTION OF THE DRAWINGS

The following figures show:
FIG. 9 a result list of an information search.

DETAILED DESCRIPTION OF CERTAIN INVENTIVE EMBODIMENTS

Figure 1:
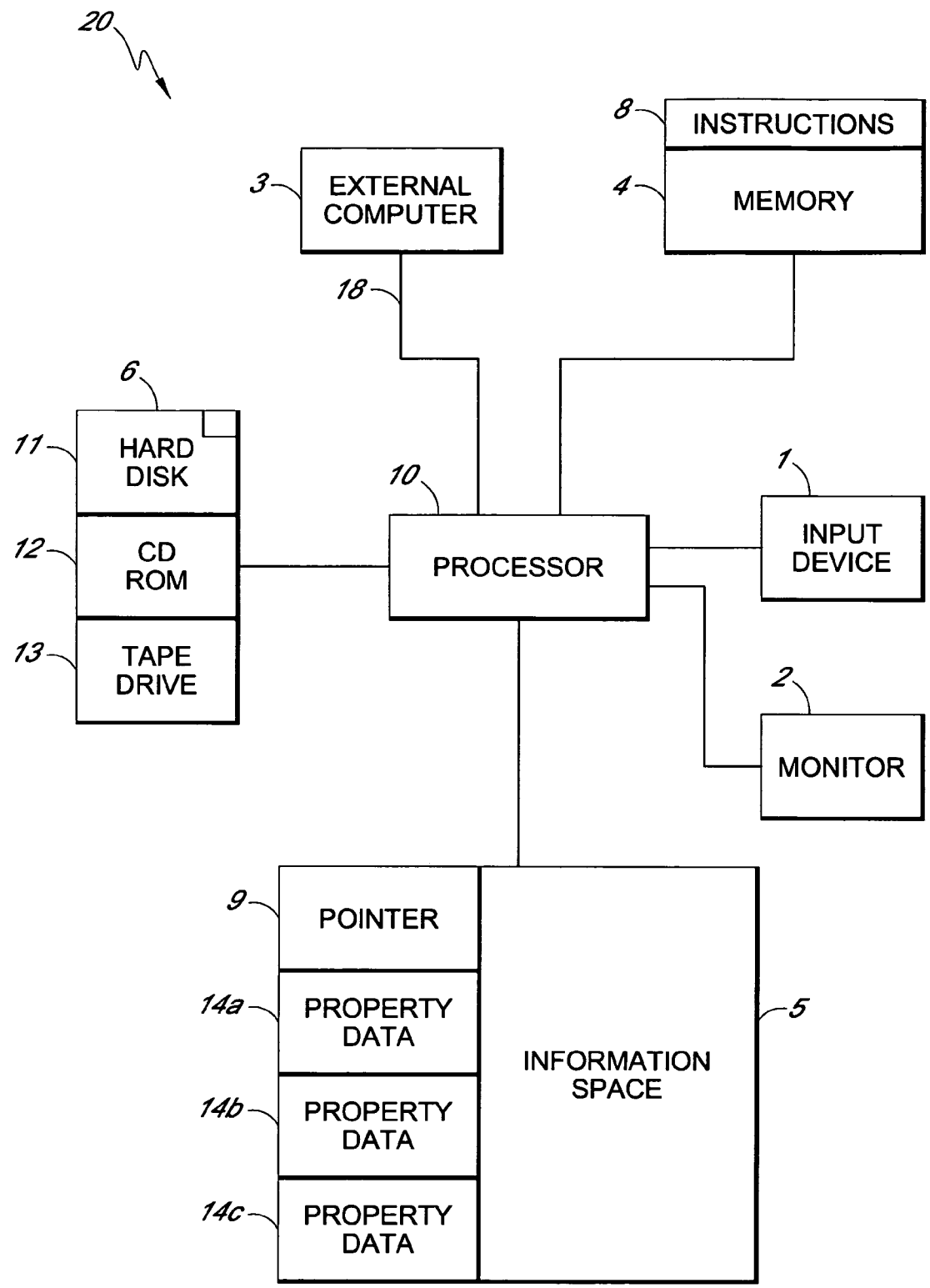
FIG. 1 A fundamental representation of a device upon which the procedure in accordance with the invention is executed.

An execution example of the procedure in accordance with the invention for the processing of data objects will now be described with reference to FIG. 1.

An information system 20 has a processor 10, an input device in the form of a keyboard 1 and an output device in the form of a monitor 2. In a memory device 4, which can have a transient and intransient element, at least on set of instructions 8 is provided, through which the procedure can be controlled. Through a data connection 18, which in the execution example can occur via the Internet, a connection to an external computer 3 can be made so that the user controls the procedure on the computer device 20 and/or the computer 20 via an external computer 3.

Furthermore, a data space 6 is provided that, in the execution example, comprises of a hard disk 11, a CD-ROM 12 and e.g. a tape drive 13 and in which single data objects 19 are organized in the form of files and the like. In the virtual information space 5 are organized the information objects 7, which in each case have a pointer 9 pointing to a data object 19. The pointer 9 can be specified in the form of a URL as "http://www.x.y.".

With other information objects, the pointer can also be specified as a local available document in the form "c:\Information\Beispiel.txt". An information object 7 has, furthermore, an information vector 14 that for the three virtual dimensions includes the property data 14*a*, 14*b* and 14*c*, which define in each case the position of the information object in the information space.

In another version, an information object 7 is provided in each case for each virtual dimension 61, 62 and 63. These information objects comprise in each case of at least one property data 14*a*, 14*b* and 14*c*.

Figure 2:
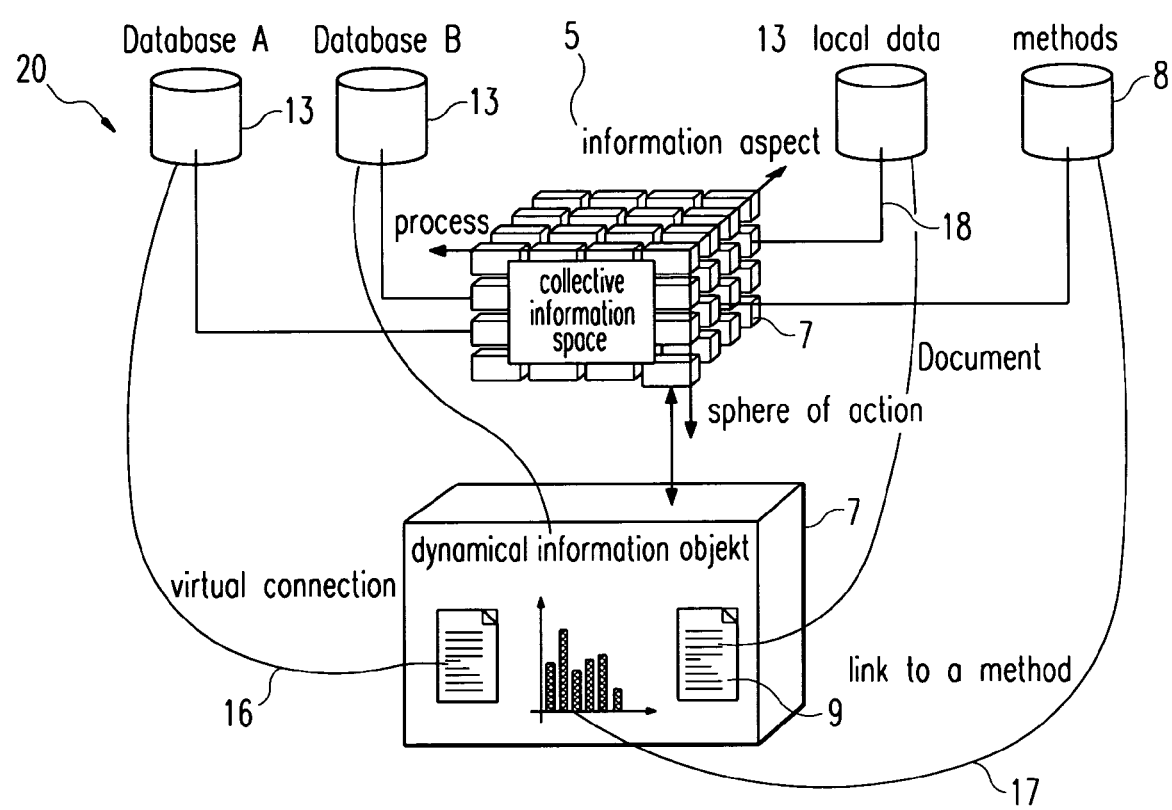
FIG. 2 a fundamental overview representation.

FIG. 2 represents a fundamental overview in accordance with the execution example according to FIG. 1. Data objects are connected in databases 13 or even local files 13 with the computer device via the data connections 18 and sets of instructions 8 are used on the information objects 7 and/or the data objects 19 via the processor 10. An information object 7 can be connected with a set of instructions via a pointer and/or a virtual connection 17, and via a pointer as a virtual connection with a data object 19.

Figure 3:
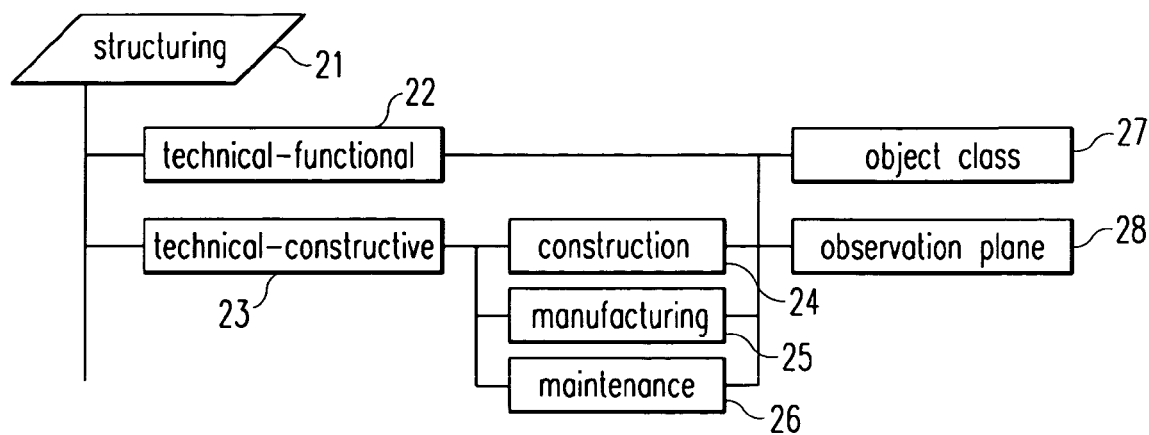
FIG. 3 a fundamental representation of the hierarchy of a structure dimension.

The structuring of a virtual dimension of the information space is represented in an exemplary way in FIG. 3. A base element of a structure dimension 21 has one or more sub-elements 22, 23, whereby in the structure example in accordance with FIG. 4, the structure element 23 in the level-0 has the sub-elements 24, 25 and 26 in the level-1. A level-2, comprising of the structure elements 27 and 28, is structured below the level-1, whereby the structure element 27 derives from the structure element 22, which is structured two levels higher. Each virtual dimension of the information space represents a difference viewpoint of the information space, whereby the different dimensions are linearly independent from one another.

Figure 4:
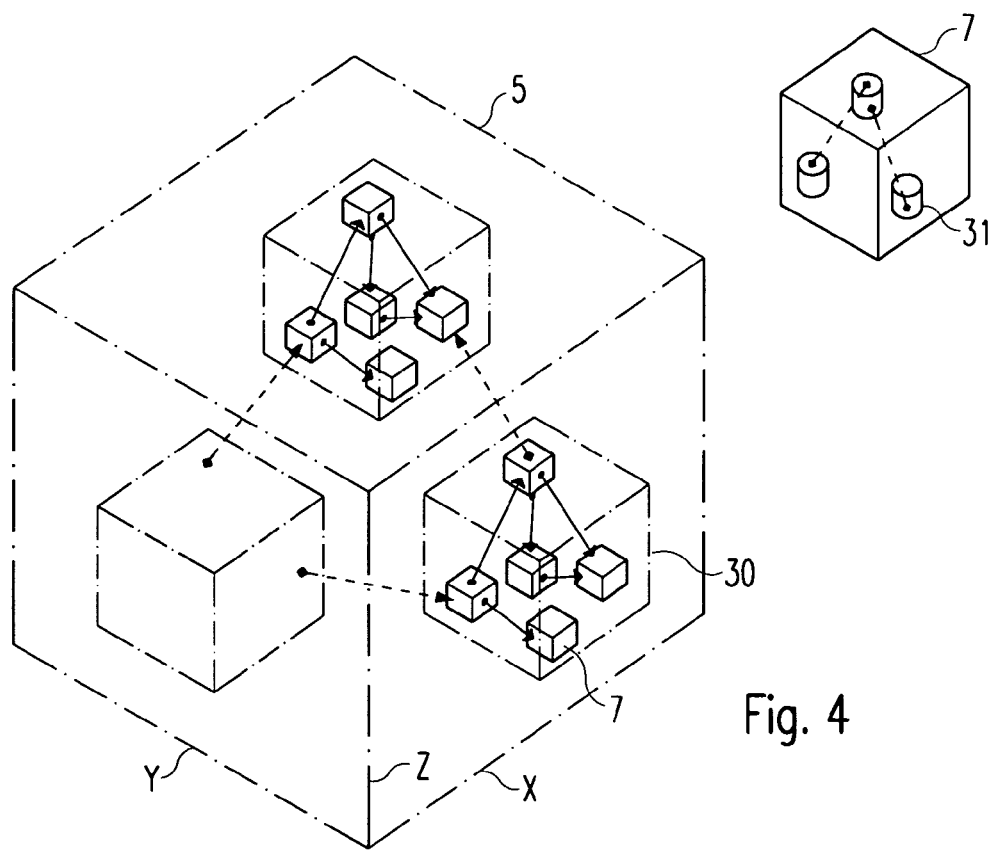
FIG. 4 a representation of a three-dimensional information space.

FIG. 4 portrays as an example the collective information space 5 as a three-dimensional cube containing the information object 7, which with reference to the three virtual dimensions can be freely structured. By means of a property vector, a single information object 7 can be identified. Furthermore, it is also possible that an information area 30 is described through a property vector, since smaller or larger information areas 38 are set up through the structuring of the property data. Every information object 7 can contain information elements 31, whereby each information element 31 can in turn be an information object 7, thus creating hierarchically structured information objects. Depending on the viewpoint, an information area 30 can also be (dynamically) represented as an information element 7.

Figure 5:
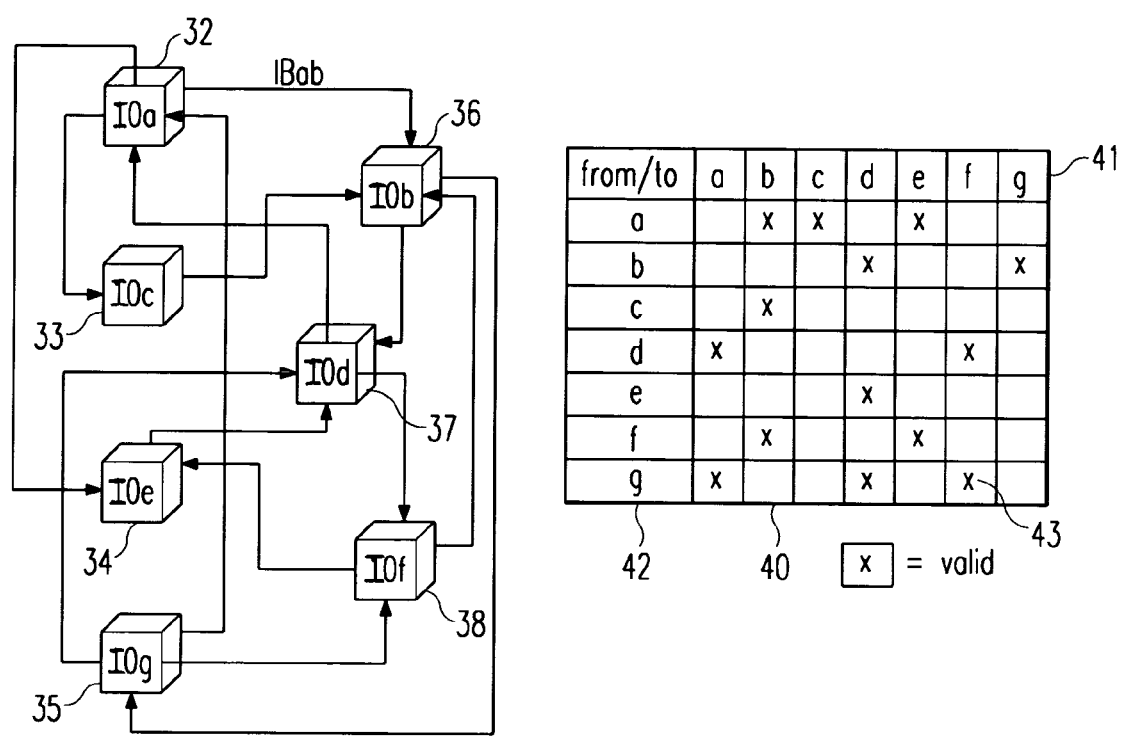
FIG. 5 a semantic network with corresponding connection matrix.

FIG. 5 portrays a semantic network between individual information objects 32, 33, 34, 35, 36, 37 and 38 with one corresponding connection space 40. In the representation, in accordance with FIG. 5, connection lines with the corresponding arrowheads show the information relationship or information connection between the individual information objects. In the execution example, the connection relationships between the individual information objects are saved in the connection spaces 40. In this example the connection spaces 40 are executed as relationship matrices. Each connection space and/or each relationship matrix has a number of rows and columns corresponding to the number of information elements in the virtual dimension, whereby the first information object is assigned row 1 and column 1, while the fifth information object is assigned to the fifth row and the fifth column.

Marking a cell in the relationship matrix of the connection space defines that a unidirectional relationship exists between the element of the corresponding row with the information object of the corresponding column. Through the relationship matrix 40 and/or the connection space 40 it can be easily ascertained, through querying the cell contents, whether an information relationship exists between two information objects.

Figure 6:
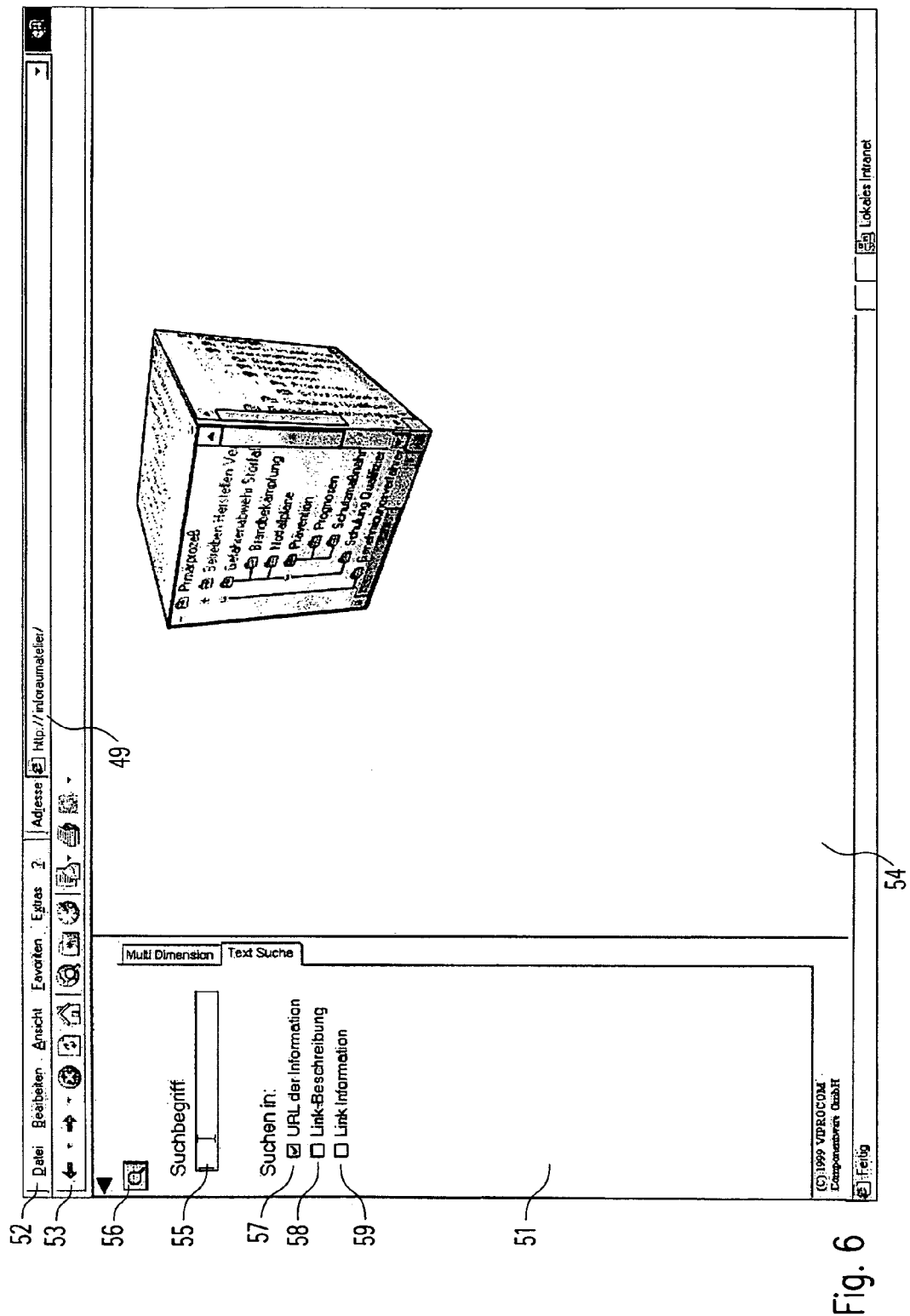
FIG. 6 a user interface.

FIG. 6 portrays a user interface for the procedure in accordance with the invention, which, for example, can be represented and processed on a remote computer.

The user interface 50, portrayed in FIG. 6 for the procedure in accordance with the invention, is displayed in an Internet browser. It is, however, also possible for the user interface to be displayed from a separate program. The graphical user interface 50 has a known browser file bar 52 and a browser navigation bar 53.

A navigation bar 51, situated in a left area of the user interface, additionally, substantially serves to control the procedure. Furthermore, in a right area of the user interface is arranged a display area 54, in which the information objects and the data objects, as well as the result lists etc can be displayed. An input field, in which the control vector 49 for controlling the procedure can be entered or even automatically created, is provided in the address field of the browser. In the representation in accordance with FIG. 6, the control vector 49 only has one address vector "http://inforaum.atelier", which identifies the procedure in accordance with the invention on the computer device.

An input field 55 for a search word is provided in the navigation bar, as well as buttons 57, 58 and 59, which restrict the search area for information to pointers for data objects or information objects (button 57), connection descriptions or link descriptions (button 58) and connection information and/or link information (button 59).

A button 56 can be operated by the user with, for example, a mouse and executes a search in the information by means of the search word entered in the input field 55.

Illustration 7 portrays the structure display area 60 exhibiting a specific representation of the navigation bar 50. The structure display area comprises of three structure browsers 61, 62, 63 for the three different virtual dimensions x, y, z of the information space.

Corresponding to the characteristic structurization 21 of the individual virtual dimensions of the information space, the property data are hierarchically presented in the three structure browsers 61, 62 and 63, whereby for each level of the property data and for each property data different relationships were chosen. The property data 64 is structured on the level-0 of the first structure dimension, while the characteristic object 65 of the third structure dimension 63 is structured on level-1 and the characteristic object 66 is structured on the second level of the third structure dimension 63.

Furthermore, a type dimension 61*a* is provided that permits a restricted search for specific document types 61*b*.

Marking, e.g. with the mouse, a property data in one or more of the structured dimensions restricts a search in the information space to one information area 30. Thus, when selecting a detailed division level in each structure dimension, the number of relevant data objects and/or files is restricted.

Actuating the button 56 starts the search procedure, a list of documents is generated, which satisfy the property data in the structure dimension, whereby, when selecting a specific level-1 in a structured dimension, all the level-2, deriving from this level-1, and subordinate documents in the list are included. With reference to FIG. 3, this means that when selecting the property data 23 in level-1, the information objects 24, 25, 26 and 28 are taken into consideration, since these derive from the property data 23. However, information objects with the property data 27 are not considered, since this derives from the property data 22 in level-1 and not from the property data 23 in level-1. If, on the other hand, the property data 21 is chosen in FIG. 3 in level-0, all the information objects from 21 until 28 would be taken into consideration in FIG. 3.

Figure 7:
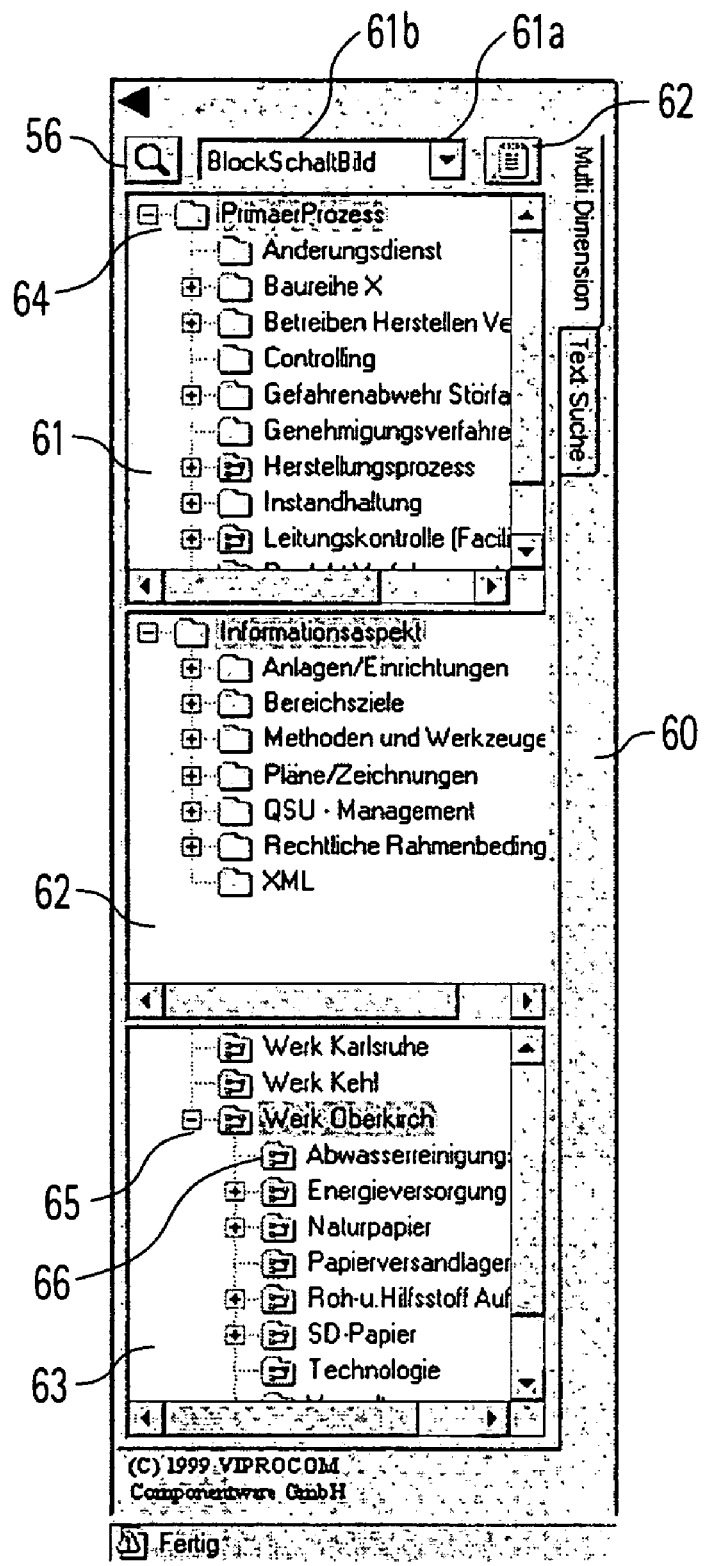
FIG. 7 another user interface.
Figure 8:
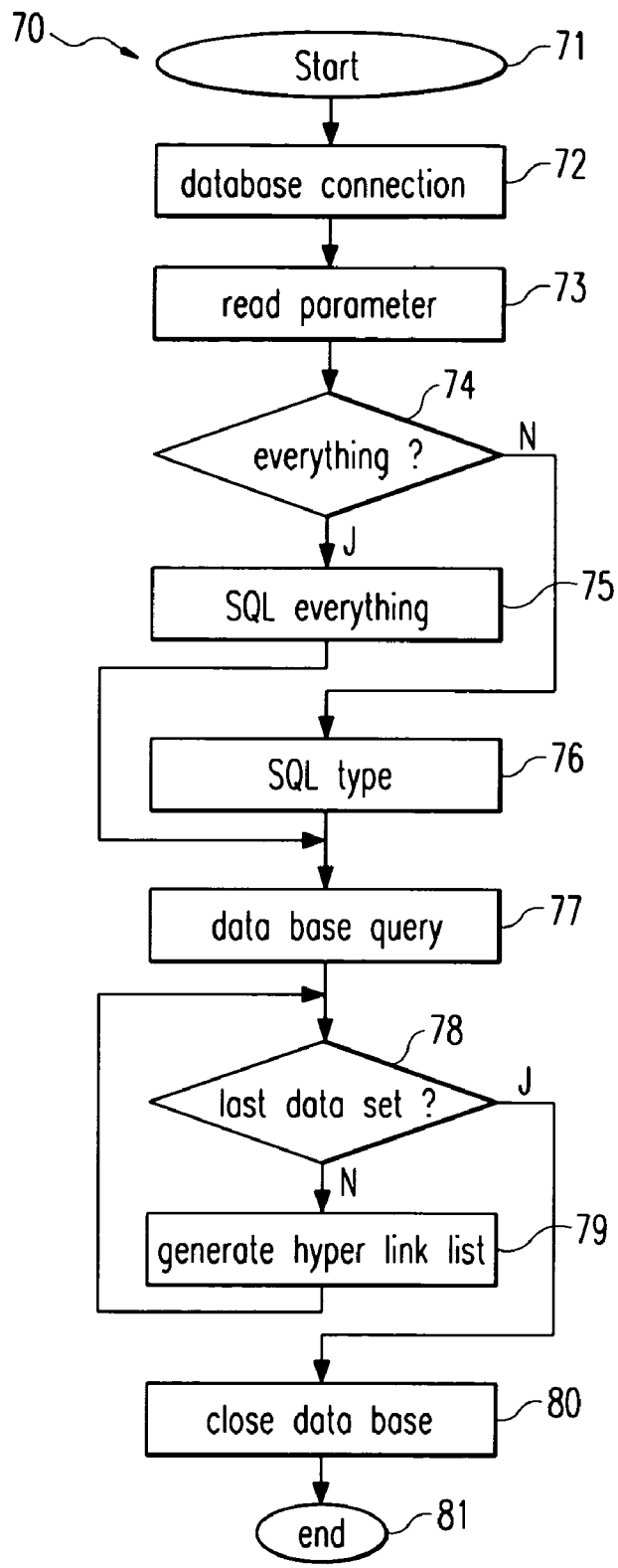
FIG. 8 a flowchart of an instruction set.
Figure 10:
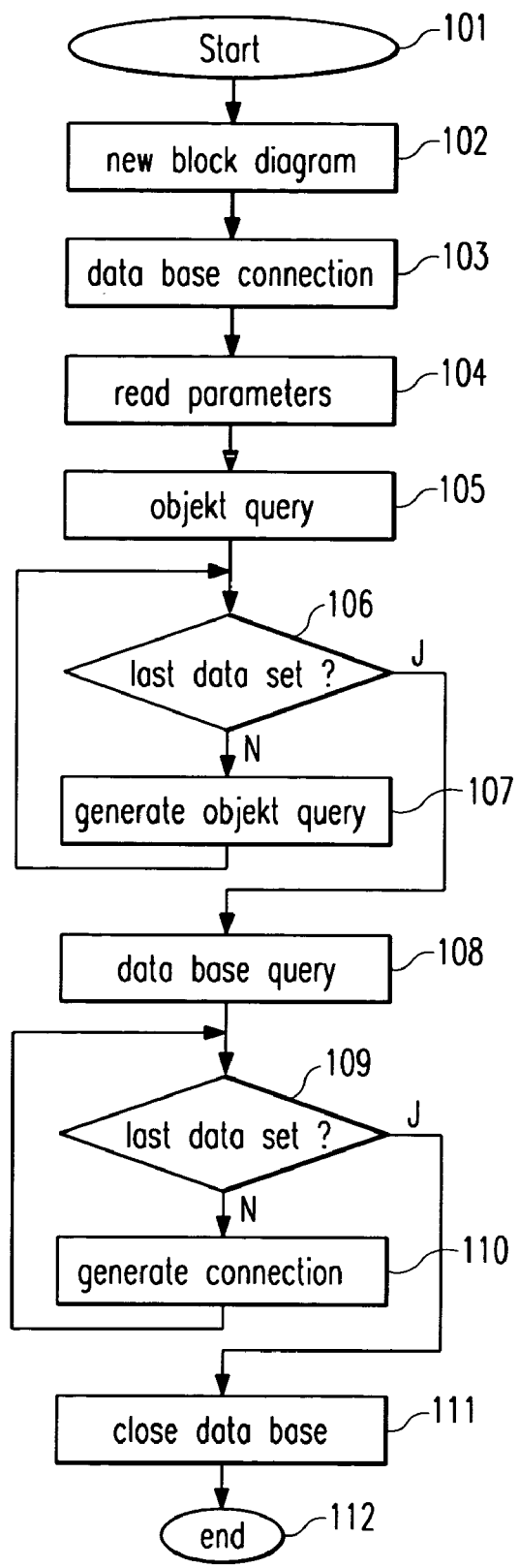
FIG. 10 a flowchart of a further set of instructions.
Figure 11:
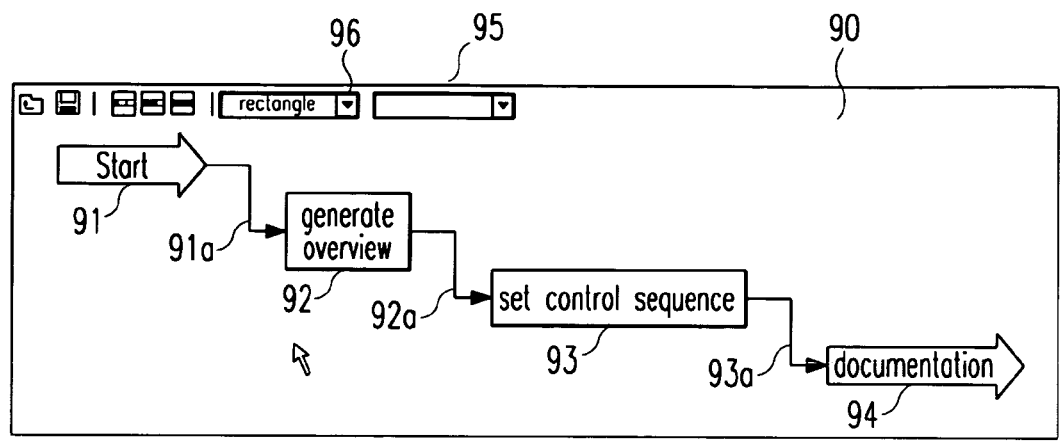
FIG. 11 a further user interface.
Figure 12:
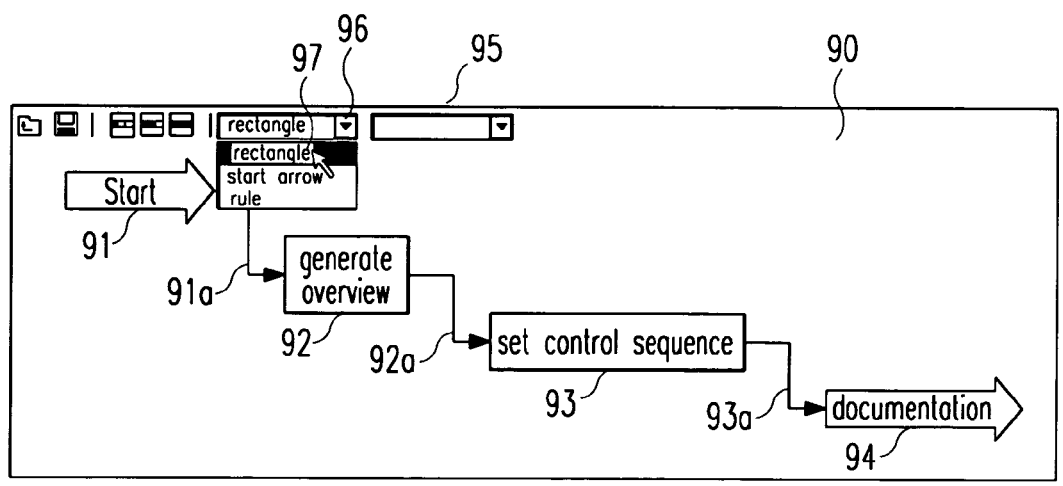
FIG. 12 a block diagram as information object.
Figure 13:
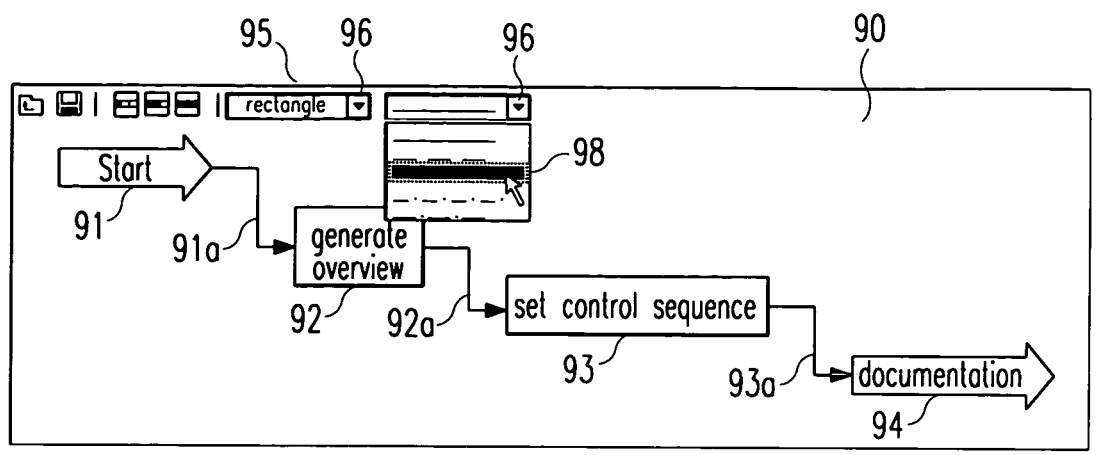
FIG. 13 a view of the process of the information object according to FIG. 12.
Figure 14:
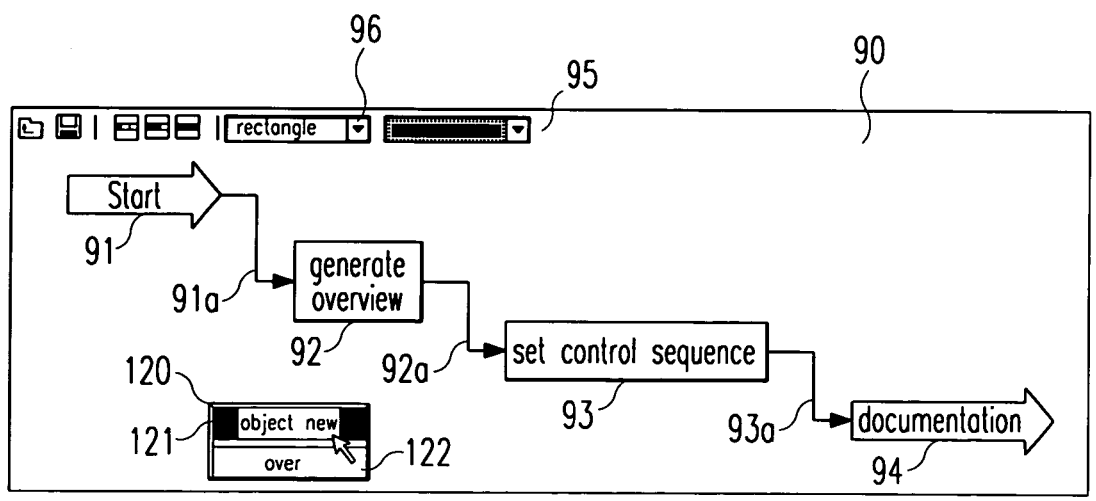
FIG. 14 a view of the process of the information object according to FIG. 12.
Figure 15:
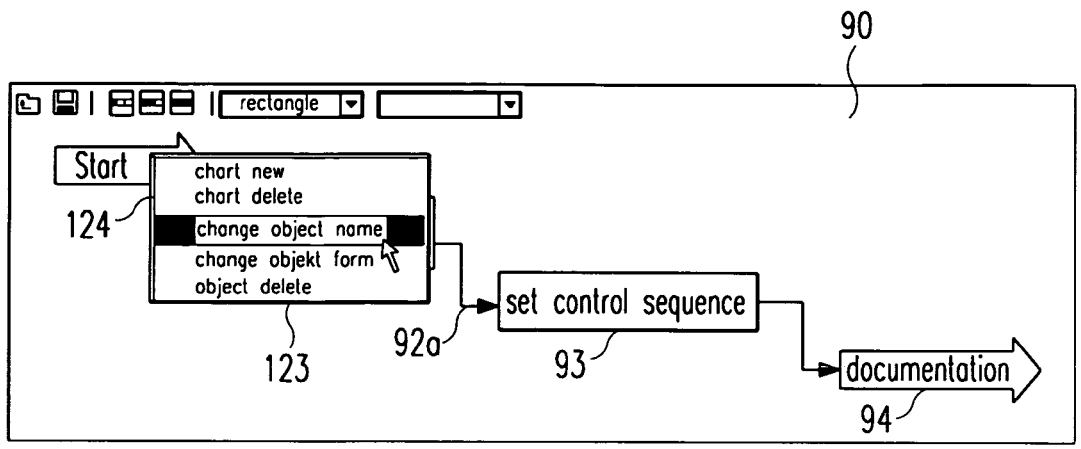
FIG. 15 a view of the process of the information object according to FIG. 12.
Figure 17:
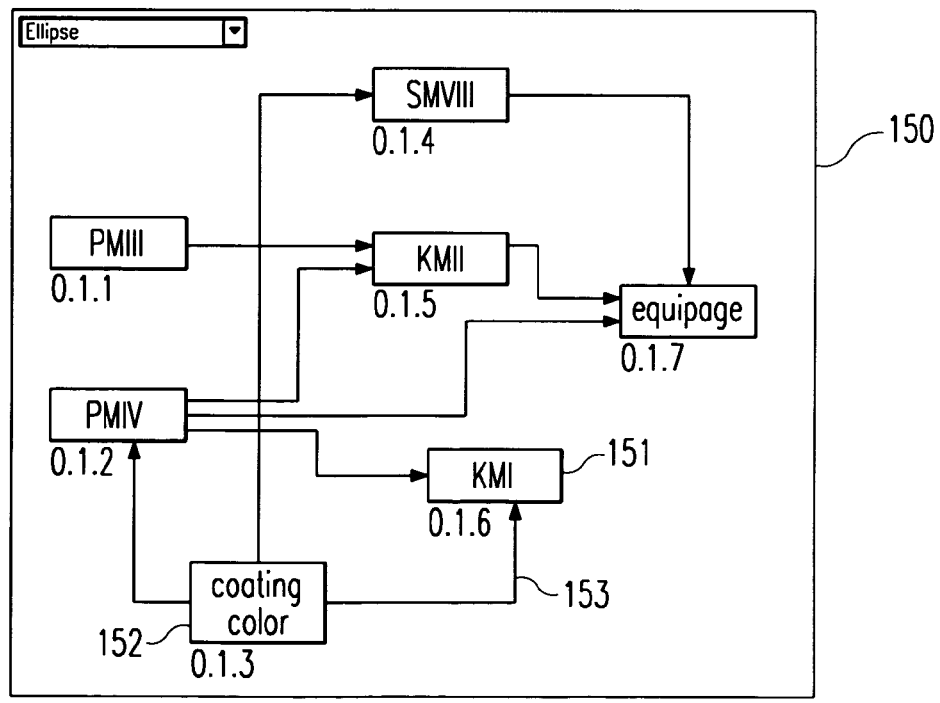
FIG. 17 a user interface for process control.

The procedure is described with reference to FIG. 8 when the button 56 is activated in accordance with FIG. 7. Through activating button 56, the start signal 71 is given for a set of instructions for discovering information. The processor device 10 establishes a database connection 72 and reads out the parameter 73 from the control vector 49. Subsequently, a branching 74 takes place. If the object type 61*b*, "everything", is selected in the type dimension 61*a*, a SQL query string is generated for indefinite documents and the database query 78 is initiated. Contrarily, if the document type 61*b* were restricted, for example, to text documents or the like, a SQL query string would be generated, in the procedural step 77, for documents according to the transferred parameters, which is then transferred to the procedural step 78 for a database query.

A result list 82 of the found information objects 7 is then processed in a loop, whereby a HTML page 82 (or also a XML document 82), which contains the found document as hyperlink 87, is generated from the result list. If the currently processed data set is last in the result list, the branching point 79 branches out to the procedural step 81 closing the database. If more data sets are available, the current data set is added in procedural step 80 to the HTML document 82 and integrated there as hyperlink 87.

Following the closure of the database in the procedural step 81, the generated HTML document 82 is returned and presented in the display area 54 as result document and/or result list 82 (cf. FIG. 9).

Navigation buttons 83, 84, 85 are for the purpose of navigation in the result lists 82, which contain a large amount of found documents 87 and/or information objects 7. With the navigation button 83 the preceding page can be displayed, while the succeeding document page is presented through activating the navigation button 84.

In the result list 82, a document type 86 and a document title 87 is presented for every information object 7, whereby clicking on the document title refers to this document. In this connection it should be emphasized that the information objects, which are referenced and/or contained within a result list, can have and/or can be process methods, so that clicking on a document title can start a possibly complex control procedure.

A further instruction set and/or procedure will now be described with reference to the FIGS. 10 to 15. If, in accordance with the above-described procedure, an object list 82 is generated, this can be represented as a block diagram or process diagram at the appropriate document types 61*b*, whereby the connections from the connection space 40 are marked as targeted arrows between the individual components in the block diagram. A new block diagram or process diagram 102 is created following activation of the start button 101.

In the procedural Step 103, a connection is established to the database and the parameter 104 is read, upon which an information query 105 occurs. If the last data set is present there is a branching out from the branching 106 to the connection query 108. However, oppositely, a further object request is generated and/or an object query is executed in the procedural step 107.

In the procedural step 108 the database query is started with the parameters, also the branching 109 and the element generation routine 110 is called up for the individual elements. The individual elements 91 to 94 of the block diagram 90 are generated and assigned. Furthermore, following closure of the database in the procedural step 111 and the finish of the block diagram generation 112 as block diagram, these individual elements 91 to 94 are represented on the display area 54.

In detail, the block diagram 90 contains, in this case, a first start element 91, which is connected via a targeted connection 91*a* with a second element 92. The element 92 is connected with a control sequence element 93 via the connection 92*a*. The block diagram 90 represents a simplified procedure, whose start is represented through the element 91. At the end of the procedure the element 94 clarifies the documentation.

This style of block diagram 90 is not only suitable for the visualization of a procedure in the form of a block diagram, but is also suitable for the modification and creation of process control plans or procedural steps. Consequently, the information object 90, which in this case was be dynamically generated from the information space 5, with the processing bar 95 containing the process element 96, can be modified. The selection elements 97 and 98 can be selected via the process elements 96.

The Menu elements 121 and 122 can be called up via a context menu 120 with a mouse, which is used for processing, whereby at the call up of the menu element 121 a new object is created in accordance with the selection elements 97 and 98.

Depending on which block element 91 to 94 is active in the block diagram, one of several menu elements 124, which permit different modifications of marked and/or activated elements, can be called up via a context menu 124 of the block element 91 to 94.

At the processing of such a block diagram not only is a diagram processed, but moreover the participating information objects in the information space are directly modified, so that through a simple graphical processing of the procedure, complex information objects and connections in between can be created.

Similarly it is possible that a block diagram or a process diagram 90 represent a process in a "rough" view, since a diagram of all the components, objects and connections would reveal too many details. Therefore, it is possible that every individual block element 91 to 94 in the block diagram 90 represents an information sphere 30 of the information space 5, which in each case has an individual information object 7 or information element 31.

Consequently, for example, through double clicking the mouse on an element the object can be represented in a new window or in the display area 54 in a separate and enlarged way, whereby the information elements or information objects contained in the information objects are represented in a more detailed way.

Through this recursive and/or aggregative characteristic of the information space, it is possible to zoom into processes, so that individual details remain hidden in a "rough" view and the user maintains the overview.

Figure 16:
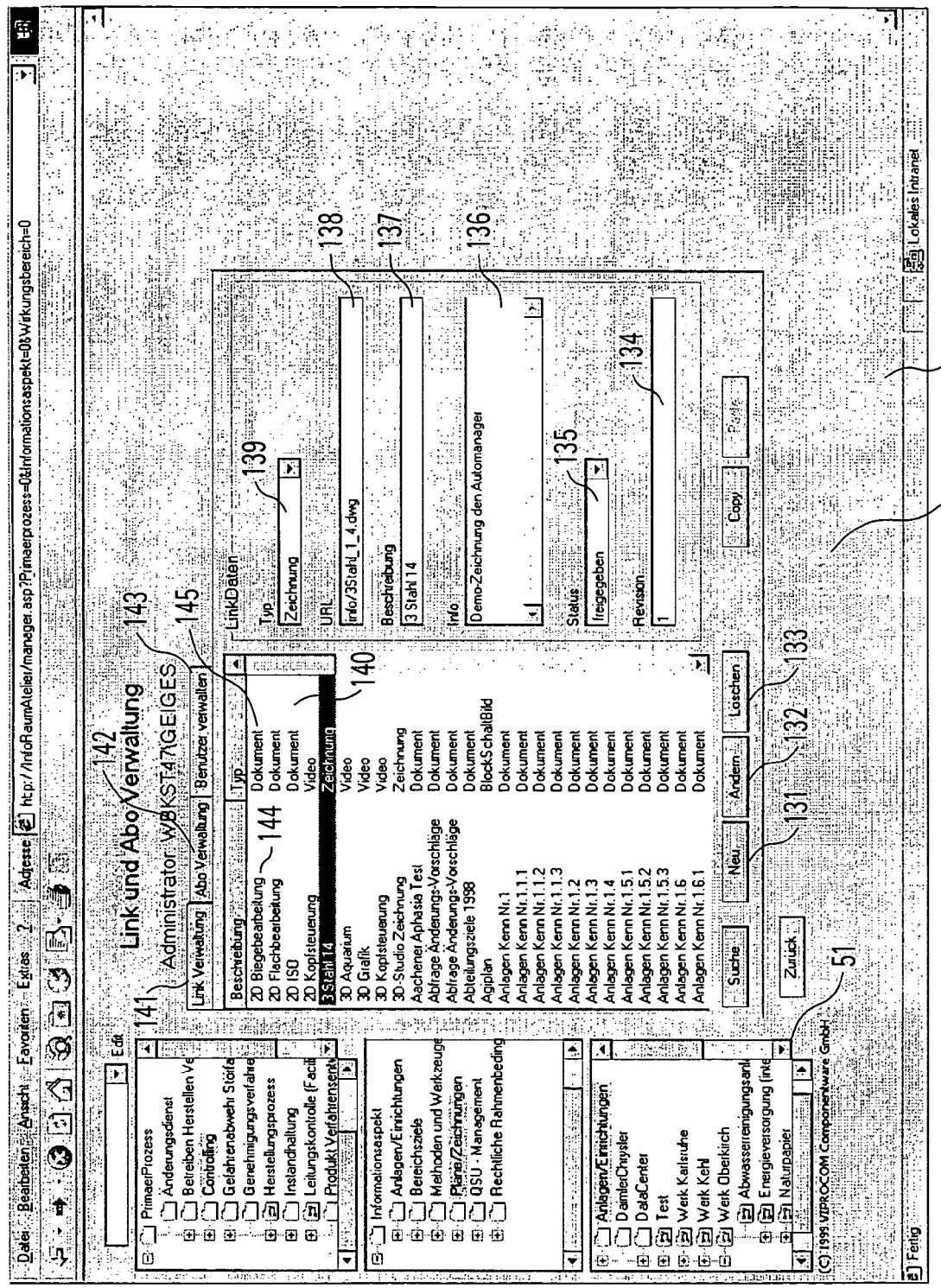
FIG. 16 an user interface for connection administration.

In FIG. 16, the display is represented in the display area 54 of an administration instruction set, which can be interactively controlled by the user via this interface.

According to the selection of individual structure elements in the structure dimensions 61 to 63 through, for example, division levels and/or elements 64 to 66, the corresponding area is represented in the display area 54.

Through operating the buttons, or rather the buttons 141, 142 and 143, the display in the display area 154 can be restricted to the corresponding information and/or data, so that when operating the button 141 the connection administration and/or link administration is represented, whereas after activating the button 142 the view is restricted to the subscription administration.

Through the subscription administration, which is integrated in the procedure, the user acquires an extensive information about modifications. For example, if a user creates a new information object in an information sphere and/or in a virtual dimension, to which another user has subscribed, then following this creation of the new information object, an e-mail containing some essential data about the newly created information object will be send to the other user.

In this way it is possible for the user to substantially maintain a constant overview of the modifications in the system. According to requirement, the subscription administration can be extended to modifications, revision changes, description changes and the like, so that it is possible for the user to be extensively informed about alterations in the system.

In one version of the information system, a list or a reference on a list, containing data concerning access to the information object, is integrated in the information objects. In this for example, the access time, the access mode (modification, write, read) and the user name, a user identification or a group identification can be logged, so that even an access statistic is possible for an information object.

Such a logging permits, amongst other things, that at the deletion of an information object before the definitive deletion, the users, who have access to the information object at least within a certain period of time, must give their consent to the deletion before the information object and/or corresponding data object is temporarily or permanently physically deleted.

If, for example, a user would like to delete an information object, in each case an e-mail can be automatically sent via the log file to the relevant users, who then send a reply e-mail to the system, which e.g. can be automatically evaluated by the system. If all the relevant users consent to a deletion, the system removes the information object and/or data object to a suitable point in time, which can also depend on the load of the system.

An automatic deletion can also occur through selecting an expiry time in the information object.

The administration interface has a button 131 for creating new information objects, which after pushing refers to a corresponding instruction set.

A button 132 serves to process a selected information object, while a button 133 prepares a deletion of an information object, whereby an actuation of this button can lead to the above-described procedures.

In a list field 140, the information objects of the selected information sphere are listed, whereby in the list a description field 144 for every information object and a field 145 for the document type is provided.

At the selection of an information object in the list 140, further information about the relevant information objects is represented in the fields 134, 135, 136, 137, 138 and 139.

In the revision field 134, a revision number of the corresponding document can be entered, while the field 135 contains status data. The information field 136 and the description field 137 serve in each case to receive descriptive information, while the field 138 contains the pointer 9, which refers to the corresponding data object 19.

In the type field 139, the type of information object is displayed.

Figure 18:
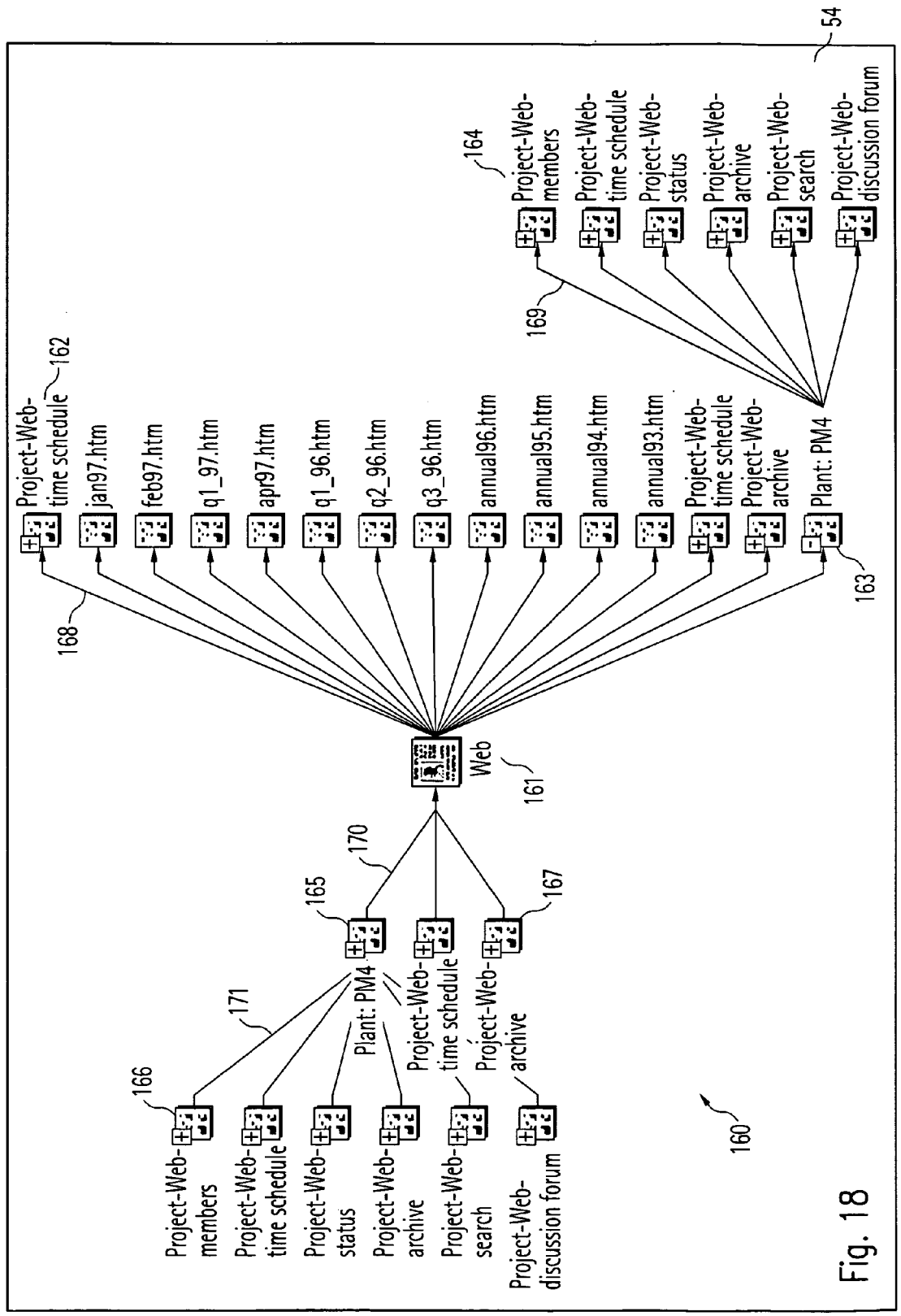
FIG. 18 a connection diagram of an information object.

In FIG. 18 an information object is represented in a process control view. The process view 150, represented as a block diagram, has different information objects 151 and 152, whereby the information object 152 is connected via a targeted connection 153 with the information object 151.

The individual information objects represent in this display format the elements of a process, whereby, for example, the information object 152 can represent a pump in a production cycle, whose rotation speed is represented through the information object 151. If the user selects the information object 151, the information object 151 is represented in more detail in the display area 154, whereby, for example, the current rotation speed of the pump, represented through the information object 152, can also be listed. Through JAVA, JINI, Active-X or RPC (remote procedure call) or basically through distributed methods a user can take over, on a computer, the process control for a system, which is executed in a remote location and which, for example, is administered through a SAP system.

FIG. 18 represents a connection diagram 160 of an information object 161, which was generated through the selection of a connection instruction set. Through the query of an information space the objects 162 are defined and automatically assigned within the diagram area 160, which have a connection from the information object 161 to an information object 162.

Information objects, which firstly via a second connection 169 refer to an information object 164, can also be listed according to the selection of the depth of the division.

Similarly, it is possible for the information objects 165 and 166, which directly or indirectly refer to the actual information object 161, to be represented. The information object 166 is connected via the targeted relationship 171 with the information object 165, which via a targeted relationship 170 refers to the actual information object 161. In this representation two connection levels are considered, however, it is possible to take only one connection level or even several levels into consideration. With a large amount of considered connection levels, however, it should be kept in mind that the number of relevant information objects and connection relationships could be high.

What is claimed is:

1. A data object processing system, comprising:
   a data space, in which data objects are arranged;
   a multi-dimensional information space that has at least two virtual dimensions and preferably also at least one third virtual dimension;
   whereby said information space has in at least one dimension a large amount of discrete memory locations suitable to represent information objects;

whereby each of said information objects represent at least one information base-object and whereby each information base-object comprises at least the following properties:
  at least one pointer data that is characteristic for the position of at least one data object in the data space; and
  at least one property data for at least one virtual dimension of said information space;
wherein at least one set of instructions is provided with at least one instruction for the processing of said data object; and
at least one computing device controlled by at least one processor, with which said information object in said information space is identifiable, and by which the processing of said data object in accordance with said instruction set can be caused;
wherein said processing system can be influenced by transferring at least one control vector comprising at least one address vector, whereby said address vector is characteristic for a position of one instruction set; and
wherein, upon transfer of a control vector and a pointer data, the following procedural steps are executed for the creation of an information object:
  a) Separating said control vector into at least one address vector and one instruction vector in a separating device;
  b) Call-up of an instruction set characterized by said instruction vector;
  c) Derivation of a property vector for a data object with said processor device;
  d) Generation of an information object from said pointer data and said property vector with said processor device; and
  e) Saving said information object in said information space.

2. The system according to claim 1, wherein,
at least one virtual dimension is hierarchically structured, whereby a position of an information object within the hierarchy is preferably defined by said property data of said information object.

3. The system according to claim 1, wherein
said information base object has at least one property data for substantially every virtual dimension, whereby for several virtual dimensions said property data can be represented as a property vector.

4. The system according to claim 1, wherein
said instruction set, of which there is at least one, is taken from a group of instruction sets, which comprise base, organization, request, creation, modification, searching, playback, representation, printing, generating, execution, control, interaction, calculation, evaluation, regulation, play instruction sets.

5. The system according to claim 1, wherein
said control vector comprises at least one instruction vector that is characteristic for at least one predefined instruction set.

6. The system according to claim 1, wherein
said control vector comprises at least one property vector, which characterizes at least one part of said information space.

7. The system according to claim 1, wherein
upon transfer of a control vector and a data object the following procedural steps are executed for the creation of an information object:
  a) Separating said control vector into at least an address vector and at least an instruction vector in a separating device;
  b) Call-up of an instruction set that is characterized by said instruction vector;
  c) Derivation of a property vector for said data object with said processor device;
  d) Saving said data object in said data space and derivation of a pointer data;
  e) Generation of an information object from said pointer and said property vector with said processor device;
  e) Saving said information object in said information space.

8. The system according to claim 1, wherein
upon transfer of a control vector the following procedural steps are executed for locating an information object
  a) Separating said control vector into at least an address vector, at least an instruction vector and at least a property vector in a separating device;
  b) Generation of a processing vector with predefined property data for substantially every virtual dimension in said processor device;
  c) Separating said property vector in said processor device into said property data for said virtual dimensions, contained in said property vector, and overwriting said property data of said processing vector with said the property data of said property vector;
  d) Generation of an empty result list;
  e) Execution of a search for information objects in said information space, which substantially have corresponding property vectors by comparing for substantially every virtual dimension said property data with said property data in said processing vector;
  f) Addition of a reference to an information object to said result list, if substantially all said property data substantially correspond;
  f) Generation and output of a result file substantially containing all elements of said result list.

9. The system according to claim 1, further comprising a second computing device configured to control the at least one computing device.

10. The system according to claim 9, wherein
said data connection is taken from a group of data connections containing data connections via telephone lines, radio, network, internet, cable, and virtual data connections.

11. The system according to claim 10, wherein
a connection protocol is used for controlling said data connection, wherein said connection protocol is taken from a group of connection protocols containing serial connections and connection protocols such as TCP/IP, UUCP, UDP, NETBIOS, NETBEUI.

12. The system according to claim 1, wherein
said information space contains at least one virtual type dimension, whereby at least one type data about a type of corresponding data object is contained in said virtual type dimension for substantially every information object.

13. The system according to claim 1, wherein
for at least one information object at least one type data is derived from said pointer data of said data object, whereby in a separating device said pointer data of said data object is separated into name elements and said at least one type data is derived from at least one characteristic name element.

14. The system according to claim 1, wherein
for at least one information object at least one type data is derived from at least one part of the contents of said data object, whereby in said separating device at least a part of said contents of said data object is separated into content elements and said at least one type data is derived from at least one characteristic content element.

15. The system according to claim 1, wherein
at least one information object contains at least one further object data taken from a group of object data, which contains at least one data of time, generation, time interval, validity, frequency, owner, group, access right, read right, write right, modification right, execution data.

16. The system according to claim 1, wherein
said object type of said data object is taken from a group of object types containing various known data formats types of text files, picture files, graphic files, spreadsheet files, CAD files, program files, audio files, video files.

17. The system according to claim 1, wherein
for at least one information object at least one description field is provided that is accessible via said information object, whereby said description field serves for receiving at least one characterizing data of said information object.

18. The system according to claim 1, wherein
an information object can have at least one connection to at least one further information object, thus enabling a navigation between connected information objects.

19. The system according to claim 1, wherein
for at least one information object, a content of at least one description field of said information object is separated in a separating device into at least one characteristic data, and at least one characteristic content data is defined.

20. The system according to claim 1, wherein
at least one first characteristic content data of an information object is compared, in a comparison device, with at least one second characteristic content data of at least one other information object, whereby on match of said first and second characteristic content data a connection of said information object to said other information object is generated.

21. The system according to claim 1, wherein
at least one virtual connection space is provided with at least two connection dimensions containing discrete memory locations, whereby said memory locations are created in such a way that said memory locations contain at least one connection data for characterizing at least unidirectional relationships between different information objects.

22. The system according to claim 21, wherein
said at least one virtual connection space has at least a two-dimensional connection table, whereby within at least one part of the rows, every row represents a different information object, and whereby, within at least one part of said columns, every column represents a different information object.

23. The system according to claim 1, wherein
upon transfer of a control vector said following procedural steps for navigation in said information system are executed:
a) Separating said control vector into at least an address vector and at least an instruction vector in a separating device;
b) Derivation of a property vector from said control vector;
c) Generation of a processing vector with predefined property data for substantially every virtual dimension in said processor device;
d) Separating of said property vector in said processor device into said property data for said virtual dimensions, contained in said property vector, and overwriting said property data of said processing vector with said property data of said property vector;
e) Generation of an empty search list;
f) Execution of a search for information objects in said information space, which substantially have corresponding property vectors, in which for substantially every virtual dimension said property data are compared to said property data in said processing vector;
g) Addition of a reference to an information object to said search list, if substantially all said property data substantially match;
h) Generation of an empty result list;
i) Execution of a search for substantially every element of said search list according to information objects in said connection space, which is connected with said information object, that is represented by said element, in at least a unidirectional way;
j) Addition of a reference to an information object to said result list, if at least one unidirectional connection exists;
k) Creation and output of a result file, which substantially contains all said elements of said result list.

24. The system according to claim 23, wherein
for at least three virtual dimensions a virtual connection space is provided.

25. The system according to claim 1, wherein
at least one information object can include at least one information element, whereby said information element can represent at least one information object.

26. The system according to claim 1, wherein
at least one protocol is used with said connection protocol, that contains interface protocols and service protocols such as http, ftp, ntp, smtp, pop, imap, OLE, ActiveX, COM, DCOM, RMI, ODBC, JINI, STEP, DTD, SQL, ADO, as well as standardizations according to CORBA.

27. The system according to claim 1, wherein
said data object is stored in said data sphere or in a database.

28. The system according to claim 1, wherein
at least one connection data contains a parameter relating to a connection intensity.

29. A data object processing system, comprising
a data space, in which data objects are arranged;
a multi-dimensional information space that has at least two virtual dimensions and preferably also at least one third virtual dimension;
whereby said information space has in at least one dimension a large amount of discrete memory locations suitable to represent information objects;
whereby each of said information objects represent at least one information base-object and whereby each information base-object comprises at least the following properties:
at least one pointer data that is characteristic for the position of at least one data object in the data space; and
at least one property data for at least one virtual dimension of said information space;

wherein at least one set of instructions is provided with at least one instruction for the processing of said data object; and at least one computing device controlled by at least one processor, with which said information object in said information space is identifiable, and by which the processing of said data object in accordance with said instruction set can be caused;

wherein said processing system can be influenced by transferring at least one control vector comprising at least one address vector, whereby said address vector is characteristic for a position of one instruction set; and wherein, upon transfer of a control vector and a data object, the following procedural steps are executed for the creation of an information object:
  a) Separating said control vector into at least an address vector and at least an instruction vector in a separating device;
  b) Call-up of an instruction set that is characterized by said instruction vector;
  c) Derivation of a property vector for said data object with said processor device;
  d) Saving said data object in said data space and derivation of a pointer data;
  e) Generation of an information object from said pointer and said property vector with said processor device;
  f) Saving said information object in said information space.

30. The system according to claim 29, wherein,
at least one virtual dimension is hierarchically structured, whereby a position of an information object within the hierarchy is preferably defined by said property data of said information object.

31. The system according to claim 29, wherein
said information base object has at least one property data for substantially every virtual dimension, whereby for several virtual dimensions said property data can be represented as a property vector.

32. The system according to claim 29, wherein
said instruction set, of which there is at least one, is taken from a group of instruction sets, which comprise base, organization, request, creation, modification, searching, playback, representation, printing, generating, execution, control, interaction, calculation, evaluation, regulation, play instruction sets.

33. The system according to claim 29, wherein
said control vector comprises at least one instruction vector that is characteristic for at least one predefined instruction set.

34. The system according to claim 29, wherein
said control vector comprises at least one property vector, which characterizes at least one part of said information space.

35. The system according to claim 29, wherein
upon transfer of a control vector the following procedural steps are executed for locating an information object
  a) Separating said control vector into at least an address vector, at least an instruction vector and at least a property vector in a separating device;
  b) Generation of a processing vector with predefined property data for substantially every virtual dimension in said processor device;
  c) Separating said property vector in said processor device into said property data for said virtual dimensions, contained in said property vector, and overwriting said property data of said processing vector with said the property data of said property vector;
  d) Generation of an empty result list;
  e) Execution of a search for information objects in said information space, which substantially have corresponding property vectors by comparing for substantially every virtual dimension said property data with said property data in said processing vector;
  f) Addition of a reference to an information object to said result list, if substantially all said property data substantially correspond;
  g) Generation and output of a result file substantially containing all elements of said result list.

36. The system according to claim 29, further comprising a second computing device configured to control the at least one computing device.

37. The system according to claim 36, wherein
said data connection is taken from a group of data connections containing data connections via telephone lines, radio, network, internet, cable, and virtual data connections.

38. The system according to claim 37, wherein
a connection protocol is used for controlling said data connection, wherein said connection protocol is taken from a group of connection protocols containing serial connections and connection protocols such as TCP/IP, UUCP, UDP, NETBIOS, NETBEUI.

39. The system according to claim 29, wherein
said information space contains at least one virtual type dimension, whereby at least one type data about a type of corresponding data object is contained in said virtual type dimension for substantially every information object.

40. The system according to claim 29, wherein
for at least one information object at least one type data is derived from said pointer data of said data object, whereby in a separating device said pointer data of said data object is separated into name elements and said at least one type data is derived from at least one characteristic name element.

41. The system according to claim 29, wherein
for at least one information object at least one type data is derived from at least one part of the contents of said data object, whereby in said separating device at least a part of said contents of said data object is separated into content elements and said at least one type data is derived from at least one characteristic content element.

42. The system according to claim 29, wherein
at least one information object contains at least one further object data taken from a group of object data, which contains at least one data of time, generation, time interval, validity, frequency, owner, group, access right, read right, write right, modification right, execution data.

43. The system according to claim 29, wherein
said object type of said data object is taken from a group of object types containing various known data formats types of text files, picture files, graphic files, spreadsheet files, CAD files, program files, audio files, video files.

44. The system according to claim 29, wherein
for at least one information object at least one description field is provided that is accessible via said information object, whereby said description field serves for receiving at least one characterizing data of said information object.

45. The system according to claim 29, wherein
an information object can have at least one connection to at least one further information object, thus enabling a navigation between connected information objects.

46. The system according to claim 29, wherein
for at least one information object, a content of at least one description field of said information object is separated in a separating device into at least one characteristic data, and at least one characteristic content data is defined.

47. The system according to claim 29, wherein
at least one first characteristic content data of an information object is compared, in a comparison device, with at least one second characteristic content data of at least one other information object, whereby on match of said first and second characteristic content data a connection of said information object to said other information object is generated.

48. The system according to claim 29, wherein
at least one virtual connection space is provided with at least two connection dimensions containing discrete memory locations, whereby said memory locations are created in such a way that said memory locations contain at least one connection data for characterizing at least unidirectional relationships between different information objects.

49. The system according to claim 48, wherein
said at least one virtual connection space has at least a two-dimensional connection table, whereby within at least one part of the rows, every row represents a different information object, and whereby, within at least one part of said columns, every column represents a different information object.

50. The system according to claim 29, wherein
upon transfer of a control vector said following procedural steps for navigation in said information system are executed:
  a) Separating said control vector into at least an address vector and at least an instruction vector in a separating device;
  b) Derivation of a property vector from said control vector;
  c) Generation of a processing vector with predefined property data for substantially every virtual dimension in said processor device;
  d) Separating of said property vector in said processor device into said property data for said virtual dimensions, contained in said property vector, and overwriting said property data of said processing vector with said property data of said property vector;
  e) Generation of an empty search list;
  f) Execution of a search for information objects in said information space, which substantially have corresponding property vectors, in which for substantially every virtual dimension said property data are compared to said property data in said processing vector;
  g) Addition of a reference to an information object to said search list, if substantially all said property data substantially match;
  h) Generation of an empty result list;
  i) Execution of a search for substantially every element of said search list according to information objects in said connection space, which is connected with said information object, that is represented by said element, in at least a unidirectional way;
  j) Addition of a reference to an information object to said result list, if at least one unidirectional connection exists;
  k) Creation and output of a result file, which substantially contains all said elements of said result list.

51. The system according to claim 50, wherein
for at least three virtual dimensions a virtual connection space is provided.

52. The system according to claim 29, wherein
at least one information object can include at least one information element, whereby said information element can represent at least one information object.

53. The system according to claim 29, wherein
at least one protocol is used with said connection protocol, that contains interface protocols and service protocols such as http, ftp, ntp, smtp, pop, imap, OLE, ActiveX, COM, DCOM, RMI, ODBC, JINI, STEP, DTD, SQL, ADO, as well as standardizations according to CORBA.

54. The system according to claim 29, wherein
said data object is stored in said data sphere or in a database.

55. The system according to claim 29, wherein
at least one connection data contains a parameter relating to a connection intensity.

56. A data object processing system, comprising:
a data space, in which data objects are arranged;
a multi-dimensional information space that has at least two virtual dimensions and preferably also at least one third virtual dimension;
whereby said information space has in at least one dimension a large amount of discrete memory locations suitable to represent information objects;
whereby each of said information objects represent at least one information base-object and whereby each information base-object comprises at least the following properties:
  at least one pointer data that is characteristic for the position of at least one data object in the data space; and
  at least one property data for at least one virtual dimension of said information space;
wherein at least one set of instructions is provided with at least one instruction for the processing of said data object; and
at least one computing device controlled by at least one processor, with which said information object in said information space is identifiable, and by which the processing of said data object in accordance with said instruction set can be caused;
wherein said processing system can be influenced by transferring at least one control vector comprising at least one address vector, whereby said address vector is characteristic for a position of one instruction set; and
wherein, upon transfer of a control vector, the following procedural steps are executed for locating an information object
  a) Separating said control vector into at least an address vector, at least an instruction vector and at least a property vector in a separating device;
  b) Generation of a processing vector with predefined property data for substantially every virtual dimension in said processor device;
  c) Separating said property vector in said processor device into said property data for said virtual dimensions, contained in said property vector, and overwriting said property data of said processing vector with said the property data of said property vector;

d) Generation of an empty result list;

e) Execution of a search for information objects in said information space, which substantially have corresponding property vectors by comparing for substantially every virtual dimension said property data with said property data in said processing vector;

f) Addition of a reference to an information object to said result list, if substantially all said property data substantially correspond; and g) Generation and output of a result file substantially containing all elements of said result list.

57. The system according to claim 56, wherein,
at least one virtual dimension is hierarchically structured, whereby a position of an information object within the hierarchy is preferably defined by said property data of said information object.

58. The system according to claim 56, wherein
said information base object has at least one property data for substantially every virtual dimension, whereby for several virtual dimensions said property data can be represented as a property vector.

59. The system according to claim 56, wherein
said instruction set, of which there is at least one, is taken from a group of instruction sets, which comprise base, organization, request, creation, modification, searching, playback, representation, printing, generating, execution, control, interaction, calculation, evaluation, regulation, play instruction sets.

60. The system according to claim 56, wherein
said control vector comprises at least one instruction vector that is characteristic for at least one predefined instruction set.

61. The system according to claim 56, wherein
said control vector comprises at least one property vector, which characterizes at least one part of said information space.

62. The system according to claim 56, further comprising a second computing device configured to control the at least one computing device.

63. The system according to claim 62, wherein
said data connection is taken from a group of data connections containing data connections via telephone lines, radio, network, internet, cable, and virtual data connections.

64. The system according to claim 63, wherein
a connection protocol is used for controlling said data connection, wherein said connection protocol is taken from a group of connection protocols containing serial connections and connection protocols such as TCP/IP, UUCP, UDP, NETBIOS, NETBEUI.

65. The system according to claim 56, wherein
said information space contains at least one virtual type dimension, whereby at least one type data about a type of corresponding data object is contained in said virtual type dimension for substantially every information object.

66. The system according to claim 56, wherein
for at least one information object at least one type data is derived from said pointer data of said data object, whereby in a separating device said pointer data of said data object is separated into name elements and said at least one type data is derived from at least one characteristic name element.

67. The system according to claim 56, wherein
for at least one information object at least one type data is derived from at least one part of the contents of said data object, whereby in said separating device at least a part of said contents of said data object is separated into content elements and said at least one type data is derived from at least one characteristic content element.

68. The system according to claim 56, wherein
at least one information object contains at least one further object data taken from a group of object data, which contains at least one data of time, generation, time interval, validity, frequency, owner, group, access right, read right, write right, modification right, execution data.

69. The system according to claim 56, wherein
said object type of said data object is taken from a group of object types containing various known data formats types of text files, picture files, graphic files, spreadsheet files, CAD files, program files, audio files, video files.

70. The system according to claim 56, wherein
for at least one information object at least one description field is provided that is accessible via said information object, whereby said description field serves for receiving at least one characterizing data of said information object.

71. The system according to claim 56, wherein
an information object can have at least one connection to at least one further information object, thus enabling a navigation between connected information objects.

72. The system according to claim 56, wherein
for at least one information object, a content of at least one description field of said information object is separated in a separating device into at least one characteristic data, and at least one characteristic content data is defined.

73. The system according to claim 56, wherein
at least one first characteristic content data of an information object is compared, in a comparison device, with at least one second characteristic content data of at least one other information object, whereby on match of said first and second characteristic content data a connection of said information object to said other information object is generated.

74. The system according to claim 56, wherein
at least one virtual connection space is provided with at least two connection dimensions containing discrete memory locations, whereby said memory locations are created in such a way that said memory locations contain at least one connection data for characterizing at least unidirectional relationships between different information objects.

75. The system according to claim 74, wherein
said at least one virtual connection space has at least a two-dimensional connection table, whereby within at least one part of the rows, every row represents a different information object, and whereby, within at least one part of said columns, every column represents a different information object.

76. The system according to claim 56, wherein
upon transfer of a control vector said following procedural steps for navigation in said information system are executed:

a) Separating said control vector into at least an address vector and at least an instruction vector in a separating device;

b) Derivation of a property vector from said control vector;

c) Generation of a processing vector with predefined property data for substantially every virtual dimension in said processor device;

d) Separating of said property vector in said processor device into said property data for said virtual dimensions, contained in said property vector, and overwriting said property data of said processing vector with said property data of said property vector;

e) Generation of an empty search list;

f) Execution of a search for information objects in said information space, which substantially have corresponding property vectors, in which for substantially every virtual dimension said property data are compared to said property data in said processing vector;

g) Addition of a reference to an information object to said search list, if substantially all said property data substantially match;

h) Generation of an empty result list;

i) Execution of a search for substantially every element of said search list according to information objects in said connection space, which is connected with said information object, that is represented by said element, in at least a unidirectional way;

j) Addition of a reference to an information object to said result list, if at least one unidirectional connection exists;

k) Creation and output of a result file, which substantially contains all said elements of said result list.

77. The system according to claim 76, wherein
for at least three virtual dimensions a virtual connection space is provided.

78. The system according to claim 56, wherein
at least one information object can include at least one information element, whereby said information element can represent at least one information object.

79. The system according to claim 56, wherein
at least one protocol is used with said connection protocol, that contains interface protocols and service protocols such as http, ftp, ntp, smtp, pop, imap, OLE, ActiveX, COM, DCOM, RMI, ODBC, JINI, STEP, DTD, SQL, ADO, as well as standardizations according to CORBA.

80. The system according to claim 56, wherein said data object is stored in said data sphere or in a database.

81. The system according to claim 56, wherein
at least one connection data contains a parameter relating to a connection intensity.

82. A data object processing system, comprising:
a data space, in which data objects are arranged;
a multi-dimensional information space that has at least two virtual dimensions and preferably also at least one third virtual dimension;
whereby said information space has in at least one dimension a large amount of discrete memory locations suitable to represent information objects;
whereby each of said information objects represent at least one information base-object and whereby each information base-object comprises at least the following properties:
at least one pointer data that is characteristic for the position of at least one data object in the data space; and
at least one property data for at least one virtual dimension of said information space;
wherein at least one set of instructions is provided with at least one instruction for the processing of said data object; and
at least one computing device controlled by at least one processor, with which said information object in said information space is identifiable, and by which the processing of said data object in accordance with said instruction set can be caused;
wherein said processing system can be influenced by transferring at least one control vector comprising at least one address vector, whereby said address vector is characteristic for a position of one instruction set; and
wherein, upon transfer of a control vector, said following procedural steps for navigation in said information system are executed:

a) Separating said control vector into at least an address vector and at least an instruction vector in a separating device;

b) Derivation of a property vector from said control vector;

c) Generation of a processing vector with predefined property data for substantially every virtual dimension in said processor device;

d) Separating of said property vector in said processor device into said property data for said virtual dimensions, contained in said property vector, and overwriting said property data of said processing vector with said property data of said property vector;

e) Generation of an empty search list;

f) Execution of a search for information objects in said information space, which substantially have corresponding property vectors, in which for substantially every virtual dimension said property data are compared to said property data in said processing vector;

g) Addition of a reference to an information object to said search list, if substantially all said property data substantially match;

h) Generation of an empty result list;

i) Execution of a search for substantially every element of said search list according to information objects in said connection space, which is connected with said information object, that is represented by said element, in at least a unidirectional way;

j) Addition of a reference to an information object to said result list, if at least one unidirectional connection exists; and k) Creation and output of a result file, which substantially contains all said elements of said result list.

83. The system according to claim 82, wherein,
at least one virtual dimension is hierarchically structured, whereby a position of an information object within the hierarchy is preferably defined by said property data of said information object.

84. The system according to claim 82, wherein
said information base object has at least one property data for substantially every virtual dimension, whereby for several virtual dimensions said property data can be represented as a property vector.

85. The system according to claim 82, wherein
said instruction set, of which there is at least one, is taken from a group of instruction sets, which comprise base, organization, request, creation, modification, searching, playback, representation, printing, generating, execution, control, interaction, calculation, evaluation, regulation, play instruction sets.

86. The system according to claim 82, wherein
said control vector comprises at least one instruction vector that is characteristic for at least one predefined instruction set.

87. The system according to claim 82, wherein
said control vector comprises at least one property vector, which characterizes at least one part of said information space.

88. The system according to claim 82, further comprising a second computing device configured to control the at least one computing device.

89. The system according to claim 88, wherein
said data connection is taken from a group of data connections containing data connections via telephone lines, radio, network, internet, cable, and virtual data connections.

90. The system according to claim 89, wherein
a connection protocol is used for controlling said data connection, wherein said connection protocol is taken from a group of connection protocols containing serial connections and connection protocols such as TCP/IP, UUCP, UDP, NETBIOS, NETBEUI.

91. The system according to claim 82, wherein
said information space contains at least one virtual type dimension, whereby at least one type data about a type of corresponding data object is contained in said virtual type dimension for substantially every information object.

92. The system according to claim 82, wherein
for at least one information object at least one type data is derived from said pointer data of said data object, whereby in a separating device said pointer data of said data object is separated into name elements and said at least one type data is derived from at least one characteristic name element.

93. The system according to claim 82, wherein
for at least one information object at least one type data is derived from at least one part of the contents of said data object, whereby in said separating device at least a part of said contents of said data object is separated into content elements and said at least one type data is derived from at least one characteristic content element.

94. The system according to claim 82, wherein
at least one information object contains at least one further object data taken from a group of object data, which contains at least one data of time, generation, time interval, validity, frequency, owner, group, access right, read right, write right, modification right, execution data.

95. The system according to claim 82, wherein
said object type of said data object is taken from a group of object types containing various known data formats types of text files, picture files, graphic files, spreadsheet files, CAD files, program files, audio files, video files.

96. The system according to claim 82, wherein
for at least one information object at least one description field is provided that is accessible via said information object, whereby said description field serves for receiving at least one characterizing data of said information object.

97. The system according to claim 82, wherein
an information object can have at least one connection to at least one further information object, thus enabling a navigation between connected information objects.

98. The system according to claim 82, wherein
for at least one information object, a content of at least one description field of said information object is separated in a separating device into at least one characteristic data, and at least one characteristic content data is defined.

99. The system according to claim 82, wherein
at least one first characteristic content data of an information object is compared, in a comparison device, with at least one second characteristic content data of at least one other information object, whereby on match of said first and second characteristic content data a connection of said information object to said other information object is generated.

100. The system according to claim 82, wherein
at least one virtual connection space is provided with at least two connection dimensions containing discrete memory locations, whereby said memory locations are created in such a way that said memory locations contain at least one connection data for characterizing at least unidirectional relationships between different information objects.

101. The system according to claim 100, wherein
said at least one virtual connection space has at least a two-dimensional connection table, whereby within at least one part of the rows, every row represents a different information object, and whereby, within at least one part of said columns, every column represents a different information object.

102. The system according to claim 82, wherein
at least one information object can include at least one information element, whereby said information element can represent at least one information object.

103. The system according to claim 82, wherein
at least one protocol is used with said connection protocol, that contains interface protocols and service protocols such as http, ftp, ntp, smtp, pop, imap, OLE, ActiveX, COM, DCOM, RMI, ODBC, JINI, STEP, DTD, SQL, ADO, as well as standardizations according to CORBA.

104. The system according to claim 82, wherein
said data object is stored in said data sphere or in a database.

105. The system according to claim 82, wherein
for at least three virtual dimensions a virtual connection space is provided.

106. The system according to claim 82, wherein
at least one connection data contains a parameter relating to a connection intensity.

* * * * *

UNITED STATES PATENT AND TRADEMARK OFFICE
CERTIFICATE OF CORRECTION

PATENT NO. : 7,085,772 B1
APPLICATION NO. : 09/869182
DATED : August 1, 2006
INVENTOR(S) : Karl-Heinz Sternemann It is certified that error appears in the above-identified patent and that said Letters Patent is hereby corrected as shown below:

First page, column 1 (Other Publications), line 1, after "Gary" delete "et al," and insert -- et al., --

First page, column 1 (Other Publications), line 4, delete "datsbases" and insert -- databases --

First page, column 1 (Other Publications), line 9, delete "Interactivee" and insert --Interactive Interface--

Second page, column 1 (Other Publications), line 4, delete "record," and insert -- Record, --

Second page, column 1 (Other Publications), line 6, delete "in" and insert -- im --

Column 1, line 41, delete "pace," and insert -- space, --

Column 2, lines 27-32, delete "Such an overlapping...............more easily scalable." and insert the same after "another." on line 26.

Column 4, line 35, delete "multidimensional" and insert -- multi–dimensional --

Column 8, line 13, after "etc.)" insert -- . --

Column 12, line 32, after "FIG. 1" delete "A" and insert -- a --

Column 12, line 55, after "FIG. 16" delete "an" and insert -- a --

Column 13, lines 16-22, delete "With other information............the information space." and insert the same after ""http://www.x.y."." on line 15.

Column 20, line 13, in Claim 7, before "Saving" delete "e)" and insert -- f) --

UNITED STATES PATENT AND TRADEMARK OFFICE
CERTIFICATE OF CORRECTION

PATENT NO. : 7,085,772 B1
APPLICATION NO. : 09/869182
DATED : August 1, 2006
INVENTOR(S) : Karl-Heinz Sternemann It is certified that error appears in the above-identified patent and that said Letters Patent is hereby corrected as shown below:

Column 20, line 17, in Claim 8, after "object" insert -- : --

Column 20, line 38, in Claim 8, before "Generation" delete "f)" and insert -- g) --

Column 22, line 51, in Claim 29, after "comprising" insert -- : --

Column 23, line 58, in Claim 35, after "object" insert -- : --

Column 26, line 58, in Claim 56, after "object" insert -- : --

Signed and Sealed this

Twentieth Day of February, 2007

JON W. DUDAS
*Director of the United States Patent and Trademark Office*